US009930480B2

(12) United States Patent  
Hagood et al.

(10) Patent No.: US 9,930,480 B2  
(45) Date of Patent: Mar. 27, 2018

(54) SYSTEM AND METHOD FOR MAPPING OF A SIGNAL DISTRIBUTION NETWORK

(71) Applicants: Brent A. Hagood, Canton, MI (US); Deepak Batra, Farmington Hills, MI (US)

(72) Inventors: Brent A. Hagood, Canton, MI (US); Deepak Batra, Farmington Hills, MI (US)

(73) Assignee: Genius Coax LLC, Plymouth, MI (US)

( * ) Notice: Subject to any disclaimer, the term of this patent is extended or adjusted under 35 U.S.C. 154(b) by 83 days.

(21) Appl. No.: 15/003,793

(22) Filed: Jan. 21, 2016

(65) Prior Publication Data

US 2016/0218846 A1 Jul. 28, 2016

Related U.S. Application Data

(60) Provisional application No. 62/105,893, filed on Jan. 21, 2015.

(51) Int. Cl.
*H04W 4/02* (2009.01)
*H04H 20/12* (2008.01)
*H04H 20/74* (2008.01)
*H04H 20/78* (2008.01)
*H04N 7/10* (2006.01)

(52) U.S. Cl.
CPC ............. *H04W 4/02* (2013.01); *H04H 20/12* (2013.01); *H04H 20/74* (2013.01); *H04H 20/78* (2013.01); *H04N 7/102* (2013.01)

(58) Field of Classification Search
None
See application file for complete search history.

(56) References Cited

U.S. PATENT DOCUMENTS

| | | | | |
|---|---|---|---|---|
| 5,126,840 A | * | 6/1992 | Dufresne | H04N 7/173 348/E7.069 |
| 2004/0107436 A1 | * | 6/2004 | Ishizaki | H04H 20/06 725/36 |
| 2004/0254757 A1 | * | 12/2004 | Vitale | H04L 43/50 702/122 |
| 2006/0179355 A1 | * | 8/2006 | Bouchard | H04L 41/024 714/42 |
| 2009/0052901 A1 | * | 2/2009 | Cagle | H04B 10/2504 398/116 |
| 2011/0289536 A1 | * | 11/2011 | Poder | H04H 60/97 725/95 |
| 2012/0074952 A1 | * | 3/2012 | Chappell | H04B 3/46 324/534 |

* cited by examiner

*Primary Examiner* — Kodzovi Acolatse
(74) *Attorney, Agent, or Firm* — L.C. Begin & Associates, PLLC

(57) ABSTRACT

A system for mapping a signal distribution network containing a central communication unit and preferably, a plurality of communication nodes installed at known locations, a method related thereto. The central communication unit and the plurality of communication nodes are capable of requesting and sending mapping information over known frequencies to map signal distribution networks at the known locations.

14 Claims, 22 Drawing Sheets

USB POWER / PROGRAM

SYSTEM AND METHOD FOR MAPPING OF A SIGNAL DISTRIBUTION NETWORK

CROSS SECTION TO RELATED APPLICATIONS

The present application claims the benefit of U.S. Provisional Application Ser. No. 62/105,893 having a filing date of Jan. 21, 2015.

FIELD OF THE INVENTION

The present invention generally relates to a system and method for mapping of a signal distribution network. More specifically, a system and method (collectively a "system") for mapping a signal distribution network by sending mapping information over pre-determined frequencies.

BACKGROUND OF THE INVENTION

In the cable television (TV) and satellite TV industry, there is a need for the mapping of signal distribution networks. When a bundle of cables is presented, oftentimes it is quite difficult to determine the endpoint of each discrete cable, not only because of the number of cables, but because of the various locations that each discrete cable might be located. Furthermore, sometimes various components that are found in between point one and point two (termination point) of the respective cable may present a block to otherwise identifying the existence of the cable at a certain location. Many other industries also have similar needs. Mapping is defined as the ability to identify wiring or cable that is associated with the cable signal being sent to each room or destination, in a residential home, for example.

Existing mapping equipment utilizes voltage for mapping. However, such products are very limited in their mapping capabilities because many cable TV and satellite TV components block voltage or have other voltage blocking situations. Such existing products are not efficient for mapping/detecting through splitters, amplifiers, attenuators, water logged cables, severed cables and other most active and passive (dark) devices.

Many existing products or systems, for mapping signal distribution networks, have a complex and/or bulky design. Such products do not work efficiently over lengthy cable lines. Furthermore, cable television companies may use alternating current voltage to power amplifiers on large distribution systems that deliver cable television (CATV) signals to homes and businesses. While there are typically circuits in the distribution system and/or equipment designed to block the widespread distribution of AC voltage across the signal distribution lines, it is possible that some of the AC voltage may "leak" into the distribution cable system. From a safety standpoint, and from a television and cable distribution performance standpoint, the mitigation of the occurrence of alternating current (AC) voltage being transmitted across cable distribution lines is desired. It would therefore be an improvement in the art to also be able to detect for the presence of AC voltage "leaks" on the cable distribution line while also mapping the various cable distribution lines.

Accordingly, there exists a need for a system and method (collectively a "system") for mapping a signal distribution network in a simple, user-friendly, reliable, wider versatile usage, cost-efficient and time-efficient manner. Also, there exists a need for such a system to function despite voltage-blocking system components and other voltage blocking situations. Oftentimes, in current mapping strategies, it has been found that certain components found in residential cable systems, such as splitters, amplifiers, diplexers, and other passive/active components may inherently block voltages that are typically transmitted from existing mapping equipment, thereby skewing the mapping results from the existing equipment.

SUMMARY OF THE INVENTION

In view of the foregoing shortcomings inherent in the prior-art, the general purpose of the present invention is to provide a system and method for mapping a signal distribution network that can be configured to include certain advantages of the prior art and to overcome certain drawbacks inherent in the prior art and adding further advantages.

The system and method of the present invention can provide for mapping a signal distribution network in a simple, user-friendly, reliable, wider versatile usage, cost-efficient and time-efficient manner. Also, the system and method of the present invention can provide for mapping a signal distribution network through blocking voltages presented by system components and other voltage blocking situations.

In one aspect, the present invention provides a system for mapping a signal distribution network. The system comprises: a central communication unit; and a plurality of communication nodes installed at known locations, such as pre-determined locations. The plurality of communication nodes are typically in bi-directional communication with the central communication unit. The central communication unit is capable of transmitting an information packet at a pre-determined request frequency to one communication node at a time. The communication node is capable of receiving and processing the information packet and sending a response packet to the central communication unit at a pre-determined response frequency. The central communication unit is capable of processing the response packet and providing information to a user on the identified communication node and the voltage on a signal distribution line associated with the identified communication node.

In another aspect, the present invention provides a system for mapping a signal distribution network. The system comprises: a central communication unit; and a plurality of communication nodes installed at known locations, such as pre-determined locations. The central communication unit is capable of transmitting an information packet simultaneously to the plurality of communication nodes. The plurality of communication nodes are capable of receiving the information packet and signaling to a user that the central communication unit and the communication nodes are on the same signal distribution line.

In another aspect, the present invention provides for a method for mapping a signal distribution network. The method comprises: transmitting an information packet at a known request frequency such as a pre-determined request frequency, by a central communication unit to one communication node at a time of a plurality of communication nodes; receiving and processing the information packet by the communication node; sending a response packet by the communication node to the central communication unit at a pre-determined response frequency; and processing the response packet and providing information by the central communication unit to a user on the identified communication node and the voltage on a signal distribution line associated with the identified communication node.

These together with other aspects of the invention, along with the various features of novelty that can characterize the invention, are pointed out with particularity in the claims annexed hereto and form a part of this disclosure. For a better understanding of the invention, its operating advantages and the specific objects attained by its uses, the accompanying drawings and descriptive matter illustrate exemplary embodiments of the invention.

BRIEF DESCRIPTION OF THE DRAWINGS

In the drawings:

FIGS. 7A-1, 7A-2, 7B-1, and 7B-2 schematically illustrate an exemplary central communication unit 200.

FIGS. 8A-1, 8A-2, 8A-3, 8A-4, 8B-1, 8B-2, and 8B-3 schematically illustrates an exemplary communication node 300.

Like reference numerals refer to like parts throughout the several views of the drawings.

DESCRIPTION OF THE INVENTION

Figure 1:
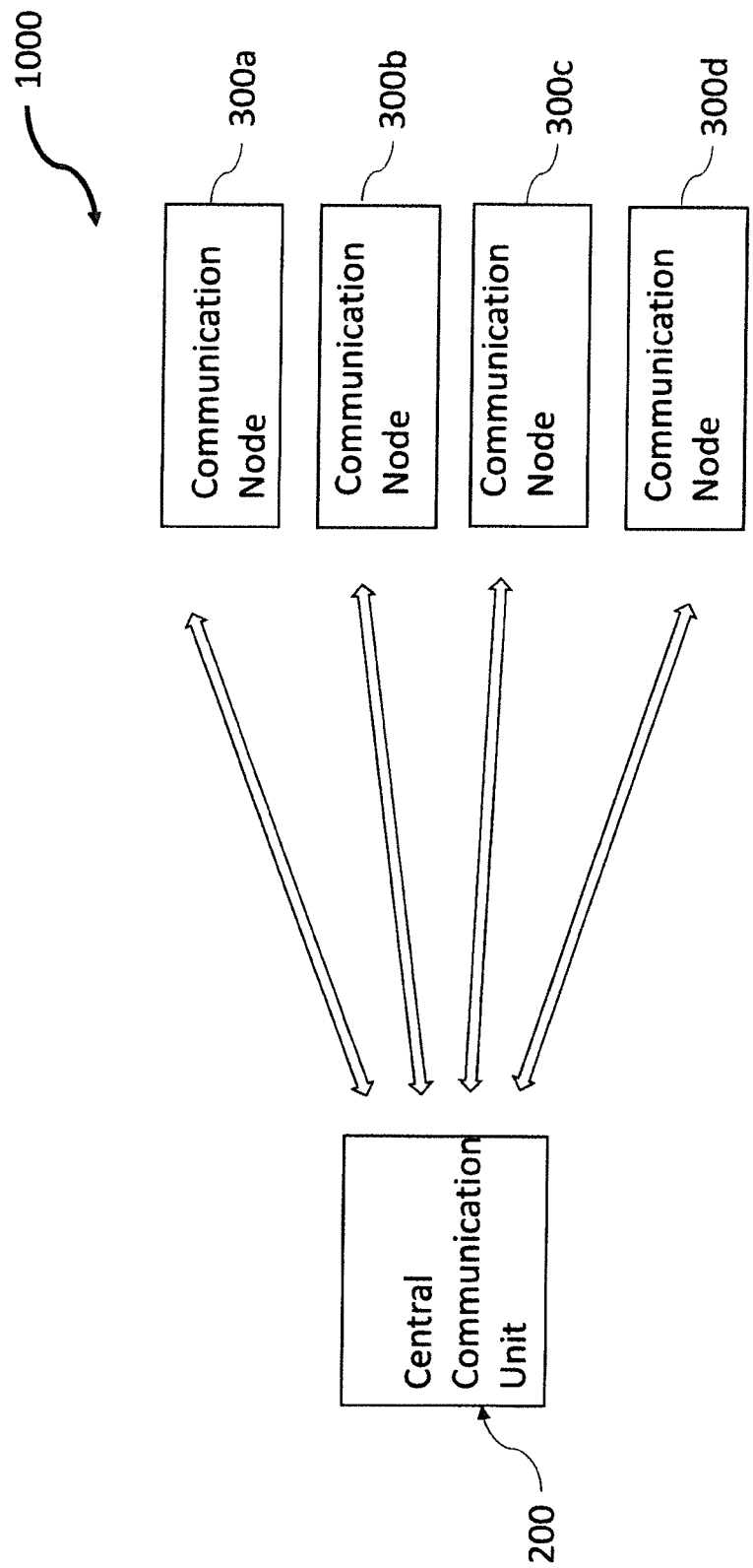
FIG. 1 illustrates a bi-directional system for mapping a signal distribution network, according to an exemplary first embodiment of the present invention.

The exemplary embodiments described herein detail for illustrative purposes are subject to many variations and designs. It should be emphasized that the present invention is not limited to particular system or method for mapping a signal distribution network. It is understood that various omissions, substitutions of equivalents are contemplated as circumstances may suggest or render expedient, but the present invention is intended to cover the application or implementation without departing from the spirit or scope of the description herein. The system and method can be implemented in a wide variety of different configurations with a wide variety of different components.

In the following description, for purposes of explanation, numerous specific details are set forth in order to provide a thorough understanding of the present invention. It will be apparent, however, to one skilled in the art that the present invention may be practiced with obvious variations to these specific details.

As used herein, the term 'plurality' refers to the presence of more than one of the referenced item and the terms 'a', 'an', and 'at least' do not denote a limitation of quantity, but rather denote the presence of at least one of the referenced item.

The present invention provides a system and method for mapping of a signal distribution network by sending mapping information over known frequencies, such as pre-determined frequencies. As used herein, the phrase "mapping of signal distribution network" refers to mapping and identification of signal distribution networks and cable networks at locations wherein such routes are required to be identified. Such locations include, for example, wall outlets, devices, coaxial cables and the like.

The system of the present invention comprises: a central communication unit; and one or more communication nodes installed at the locations wherein the mapping is desired. The central communication unit and communication nodes are capable of communicating with each other for mapping out cable networks and signal distribution in buildings and other infrastructure. The communication nodes can be installed at each location wherein the mapping/route identification is desired. Once communication nodes are installed, the central communication unit is capable of communicating with the communication nodes by sending an information packet at a pre-determined or otherwise known frequency to determine whether the communication nodes are on the same signal network as the central communication unit.

Due to the present invention providing for mapping of signal distribution networks by sending mapping information over frequencies (instead of voltage), the system and method of the present invention can allow for efficient mapping even through components that block voltage (or offer substantial resistance). Specifically, the present invention can provide for efficient mapping/detection through splitters, amplifiers, attenuators, water-logged cables, damaged cables, and other most active and passive (dark) devices.

Further, the present invention can provide for selection of pre-determined or otherwise known frequencies, such that, the mapping is not affected or interfered with devices and cables operating at different frequencies. For example, with respect to the cable television (TV) and satellite TV industry, the present invention can employ frequencies that fall in the range that is relevant for this industry. Accordingly, when such frequencies are used when the invention is in operation, mapping can be efficiently provided for by passing through the components/cables in the cable TV/satellite TV industry without affecting/hindering the operation of other devices. For example, the frequencies do not interfere with the Cable Modem Termination System (CMTS) return paths, or other known cable network configurations.

In a first embodiment, as shown in FIG. 1, a system for mapping of a signal distribution network 1000 (hereinafter referred to as system 1000) is illustrated. The system 1000 comprises: a central communication unit 200 (CCU); and a plurality of communication nodes 300a, 300b, 300c, and 300d (collectively referred to as communication node/nodes 300). As illustrated in FIG. 1, the communication nodes 300 are in a bi-directional communication with the central communication unit 200. "Bi-directional communication" is meant to indicate that both the CCU and the communication node(s) can transmit and receive signals from each other. As discussed above, the communication nodes 300 are installed at pre-determined or otherwise known locations wherein the mapping of signal distribution/cable networks is required. Such locations include, but are not limited to, wall outlets, devices, and coaxial cables.

In this embodiment, when in operation, the central communication unit 200 is capable of transmitting an information packet at a pre-determined request frequency to the communication nodes 300. The frequency may be any desired frequency able to be generated and transmitted by the CCU board 230, such as 315 MHZ or 434 MHZ (megahertz). The limiting factor on the frequency would be that, as iteratively or otherwise determined, it must not interfere with the signals normally sent on the respective cable distribution line. The communication nodes 300 are capable of receiving the information packet and sending a response packet to the central communication unit 200 at a pre-determined response frequency. Accordingly, in this embodiment, the system of the present invention can employ two different radio frequencies (particularly, the pre-determined request frequency and the pre-determined response frequency) to work in a bi-directional mode over a single cable/signal distribution line (that is, through a single conductor on the cable/signal distribution line). Frequencies may be modified depending on the particular industry by modifying the hardware as known in the art. For example, the transmitter and receiver on a respective board such as board 230 would be exchangeable to accommodate a desired frequency. The RF/transmitter or RF/receiver of each board is a standard or known constituent that is currently available commercially, and broadcasts or transmits at various frequencies. Other constituents used in the construction of the various boards in the system, and in the system more generally, are also available commercially.

Figure 2:
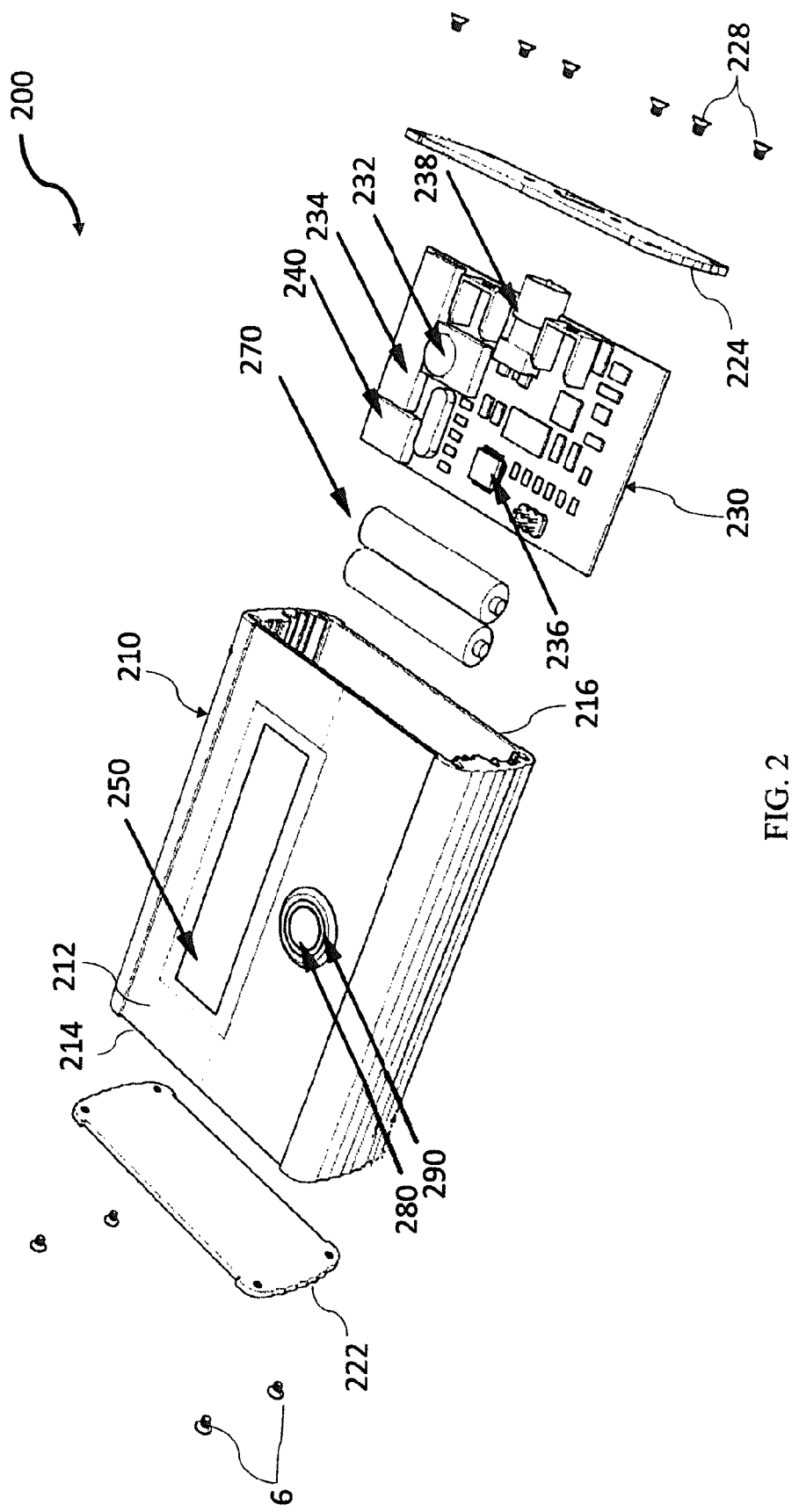
FIG. 2 illustrates a central communication unit of the system of FIG. 1.
Figures 1, 7A:
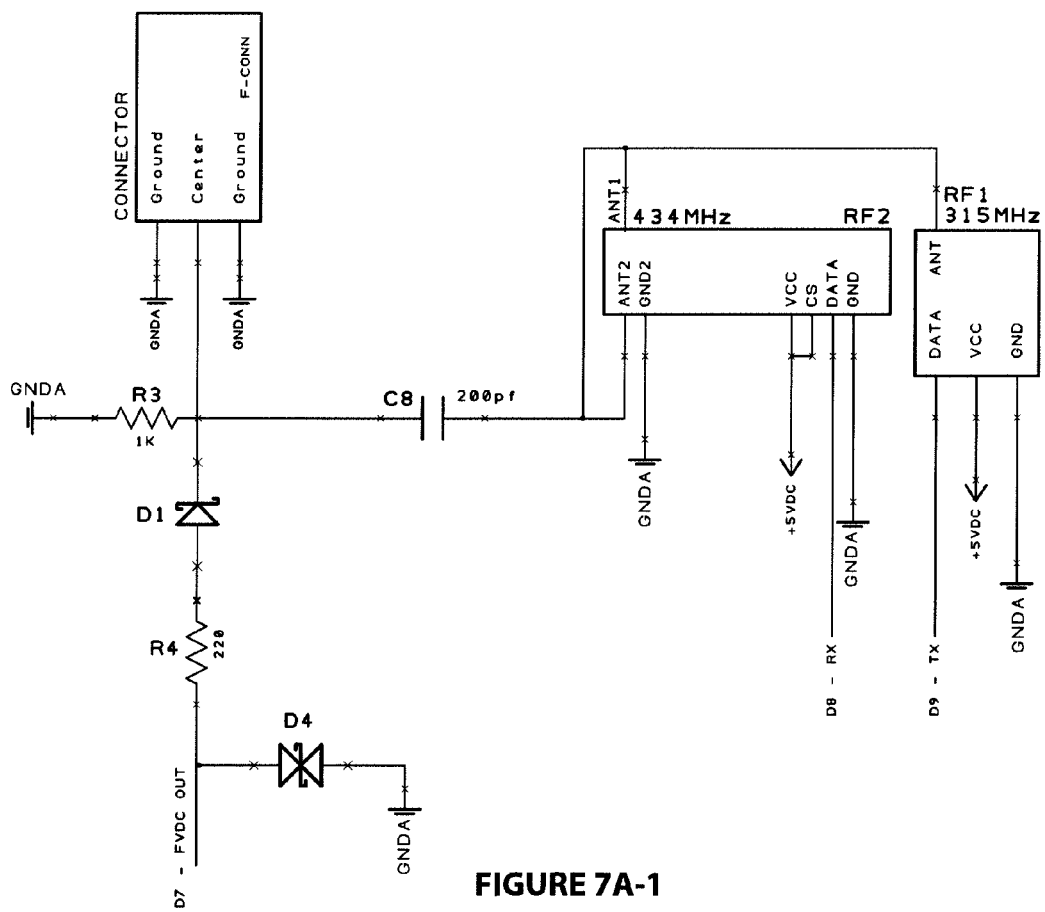
Figures 2, 7A:
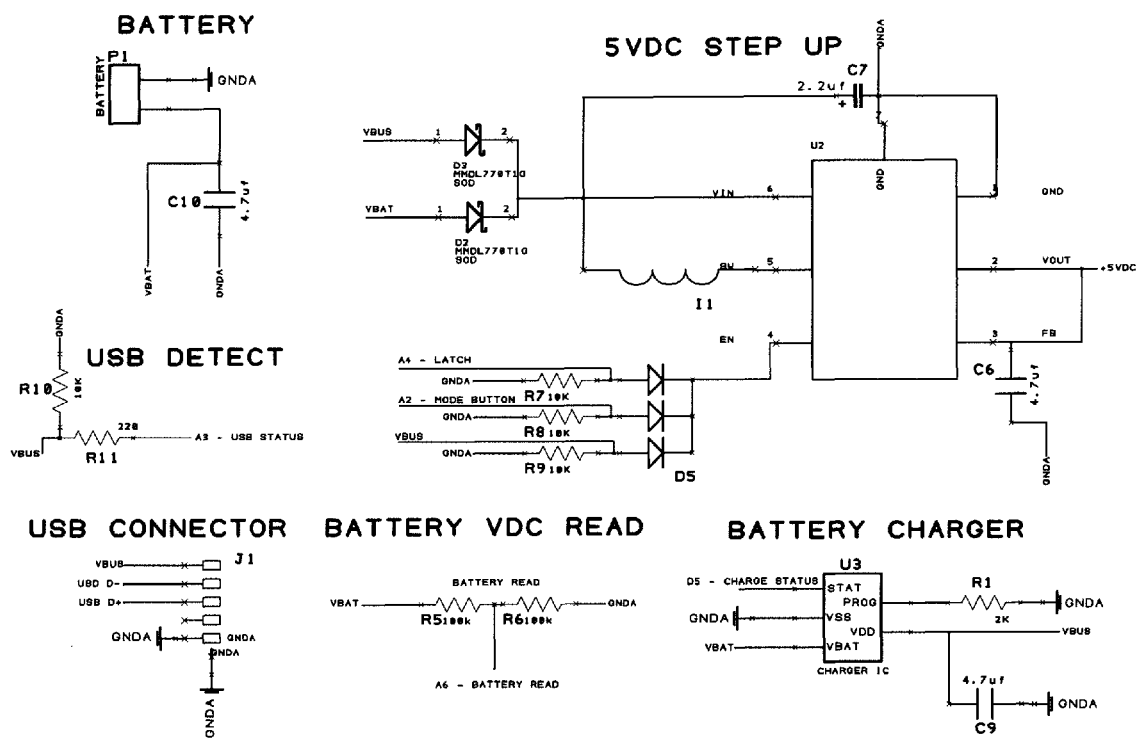
Figures 1, 7B:
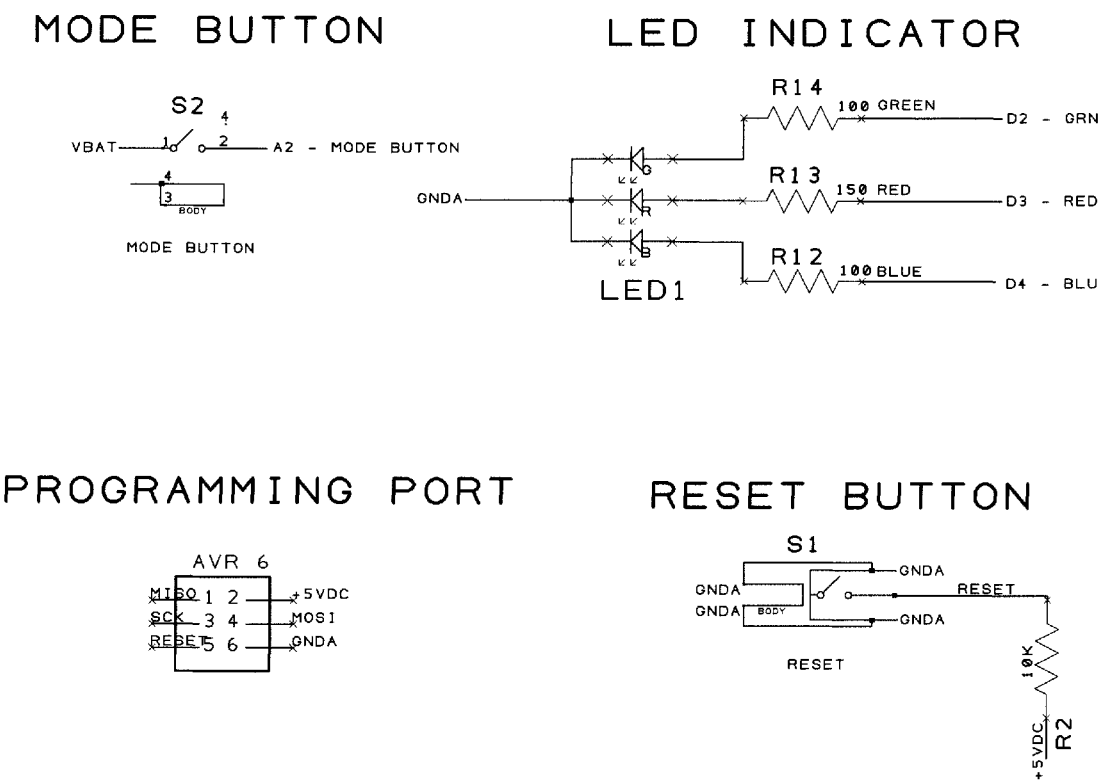
Figures 2, 7B:
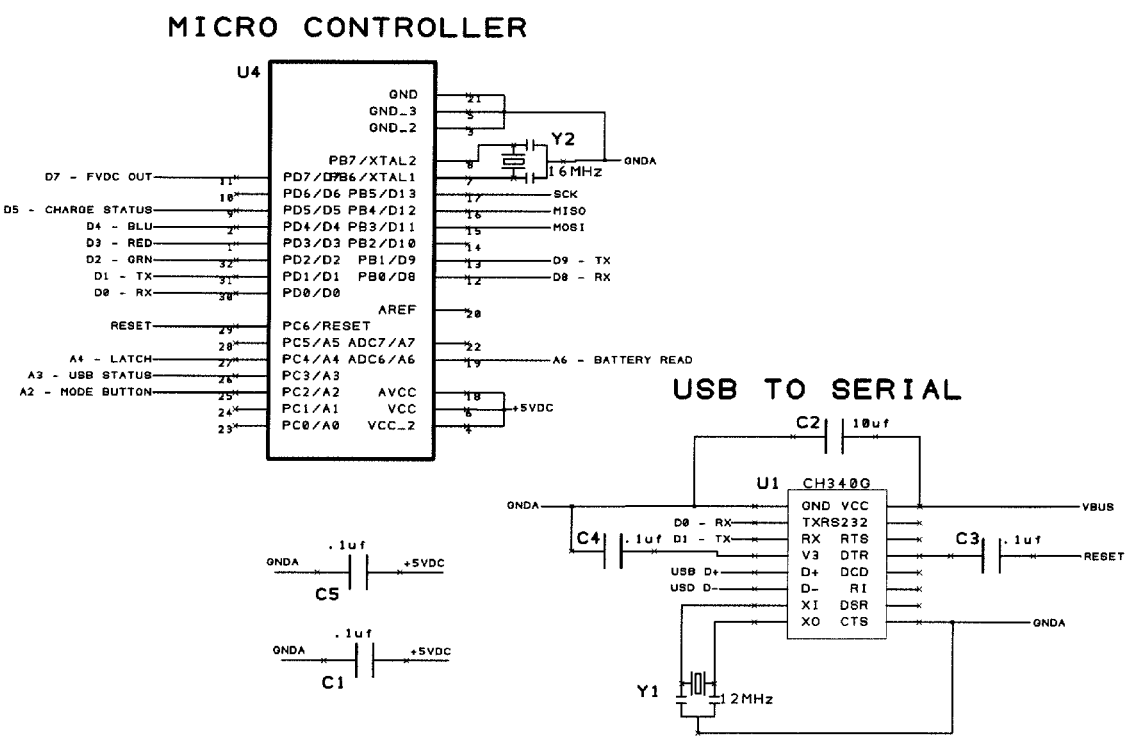

Referring to FIG. 2, the central communication unit (CCU) 200 comprises: a central housing 210; a central circuit board 230 installed inside the housing 210; a receiver screen or display screen 250 embedded on a top surface 212 of the central housing 210; a power switch 280 and an LED indicator unit 290 embedded on the top surface 212 of the central housing 210. Additionally, the central communication unit 200 comprises power supply in form of one or more batteries 270 installed inside the central housing 210. Circuitry for the CCU 200 is exemplified in FIGS. 7A and 7B.

The central housing 210 comprises: a first side cover 222 for covering a first side 214 of the central housing 210; and a second side cover 224 for covering a second side 216 of the central housing 210. The first side cover 222 is detachably engaged to the first side 214 using screws 226 that fit into corresponding slots on the first side 214 of the central housing 210. Similarly, the second side cover 224 is detachably engaged to the second side 216 using screws 228 that fit into corresponding slots on the second side 216 of the central housing 210. The detachable engagement of the first and second side covers 222, 224 with the first and second sides 214, 216 allows for introduction and removal of circuit board 230 and the batteries 270 from the central housing 210. It will be evident to a person skilled in the art that the mechanism for detachable engagement is not limited to the mechanism illustrated in FIG. 2. Also, it will be evident to a person skilled in the art that the present invention is not limited to shape of the central housing 210 or the configuration of the components therein.

Referring again to FIG. 2, the central circuit board 230 comprises: a central radio frequency (RF) transmitter 232; a central radio frequency (RF) receiver 234; a microcontroller 236; a connector 238; and a mode dip switch 240.

The connector 238 can be any connector that is capable of working with radio frequency (RF) signals and has appropriate shielding. For example, the connector 238 is a male F connector. However, it will be evident to a person skilled in the art that the connector 238 can be any connector that can be adapted, replaced and exchanged with an existing connector on the central circuit board 230 for matching required industrial applications.

Figure 3:
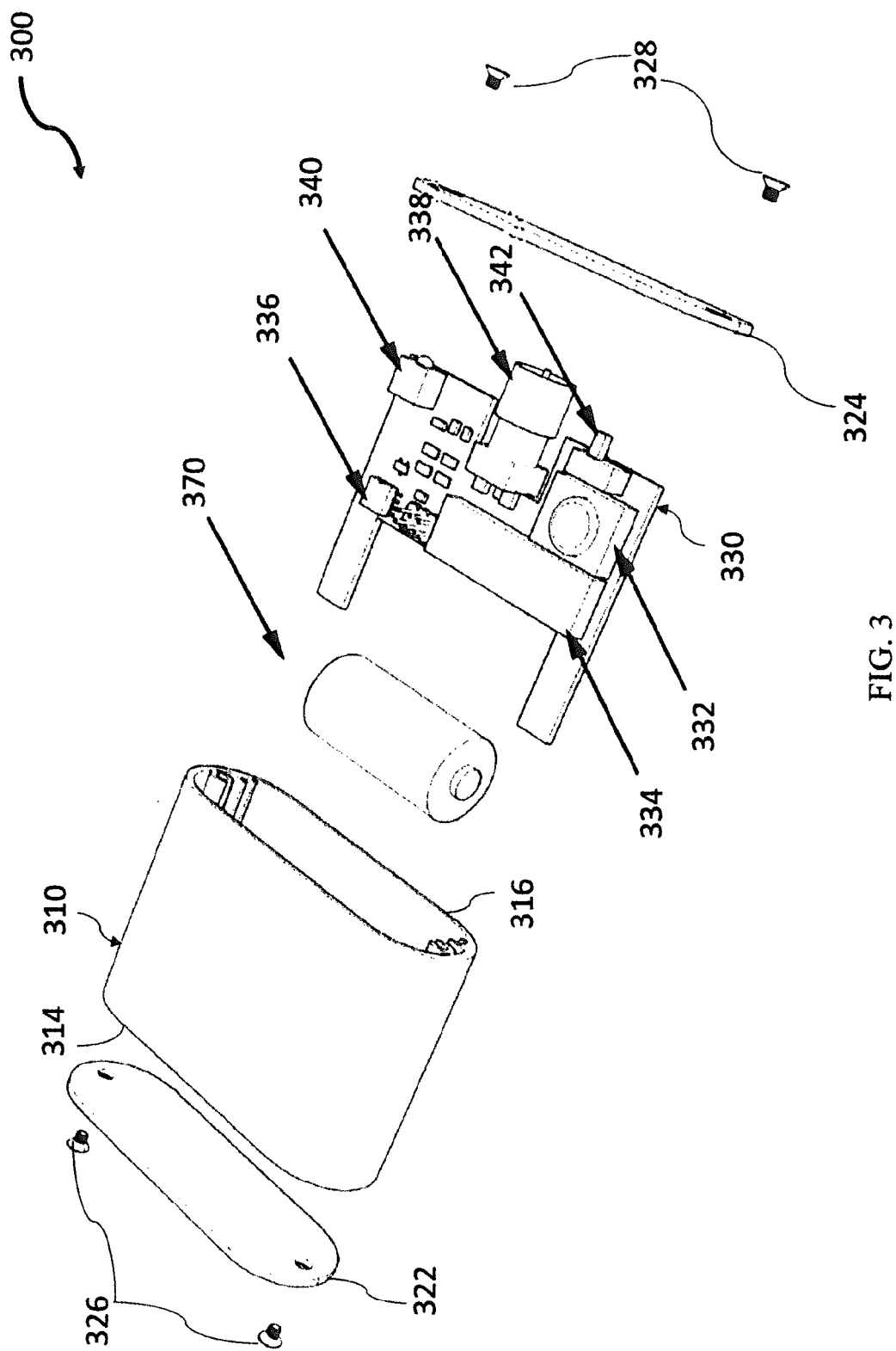
FIG. 3 illustrates a communication node of the system of FIG. 1.

Referring to FIG. 3, communication node 300 comprises: a housing 310; and a circuit board 330 installed inside the housing 310. Additionally, the communication node 300 comprises power supply in form of one or more batteries 370 installed inside the housing 310.

The housing 310 comprises: a first side cover 322 for covering a first side 314 of the housing 310; and a second side cover 324 for covering a second side 316 of the housing 310. The first side cover 322 is detachably engaged to the first side 314 using screws 326 that fit into corresponding slots on the first side 314 of the housing 310. Similarly, the second side cover 324 is detachably engaged to the second side 316 using screws 328 that fit into corresponding slots on the second side 316 of the housing 310. The detachable engagement of the first and second side covers 322, 324 with the first and second sides 314, 316 allows for introduction and removal of circuit board 330 and the batteries 370 from the housing 310. It will be evident to a person skilled in the art that the mechanism for detachable engagement is not limited to the mechanism illustrated in FIG. 3. Also, it will be evident to a person skilled in the art that the present invention is not limited to shape of the housing 310 or the configuration of the components therein.

Figures 1, 8A:
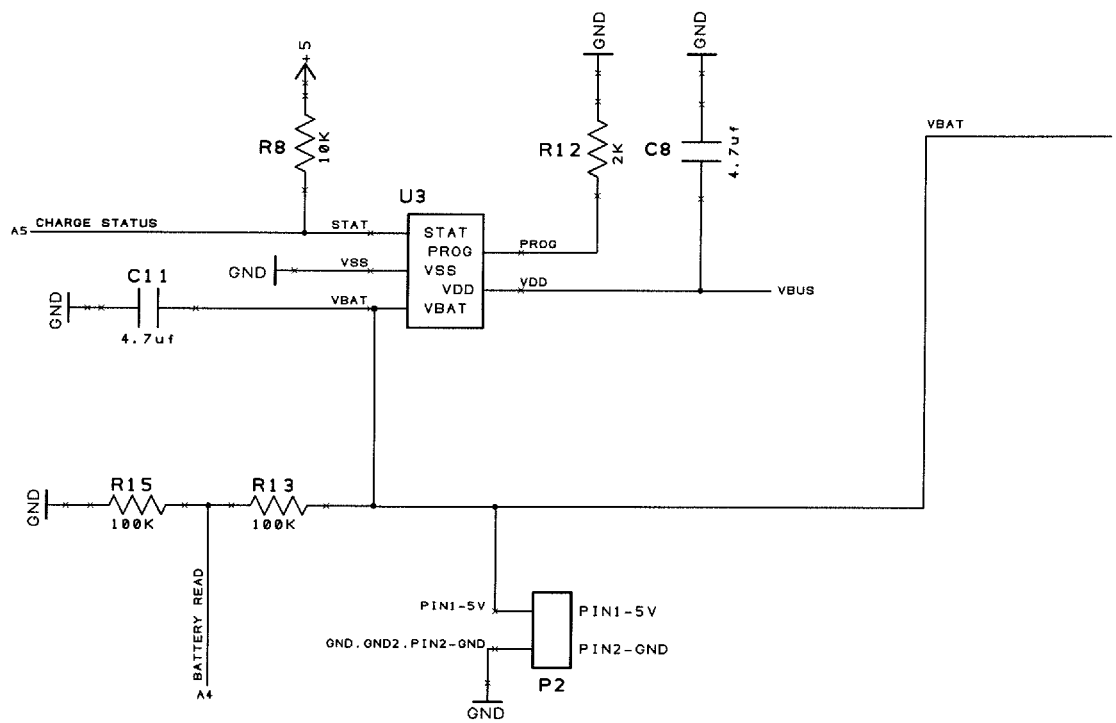
Figures 2, 8A:
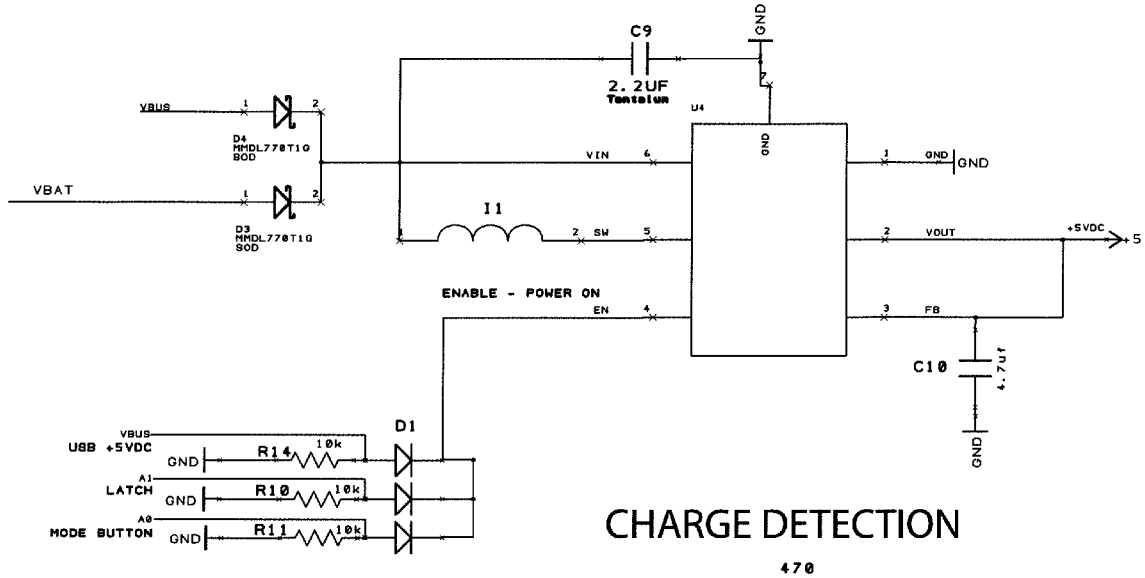
Figures 3, 8A:
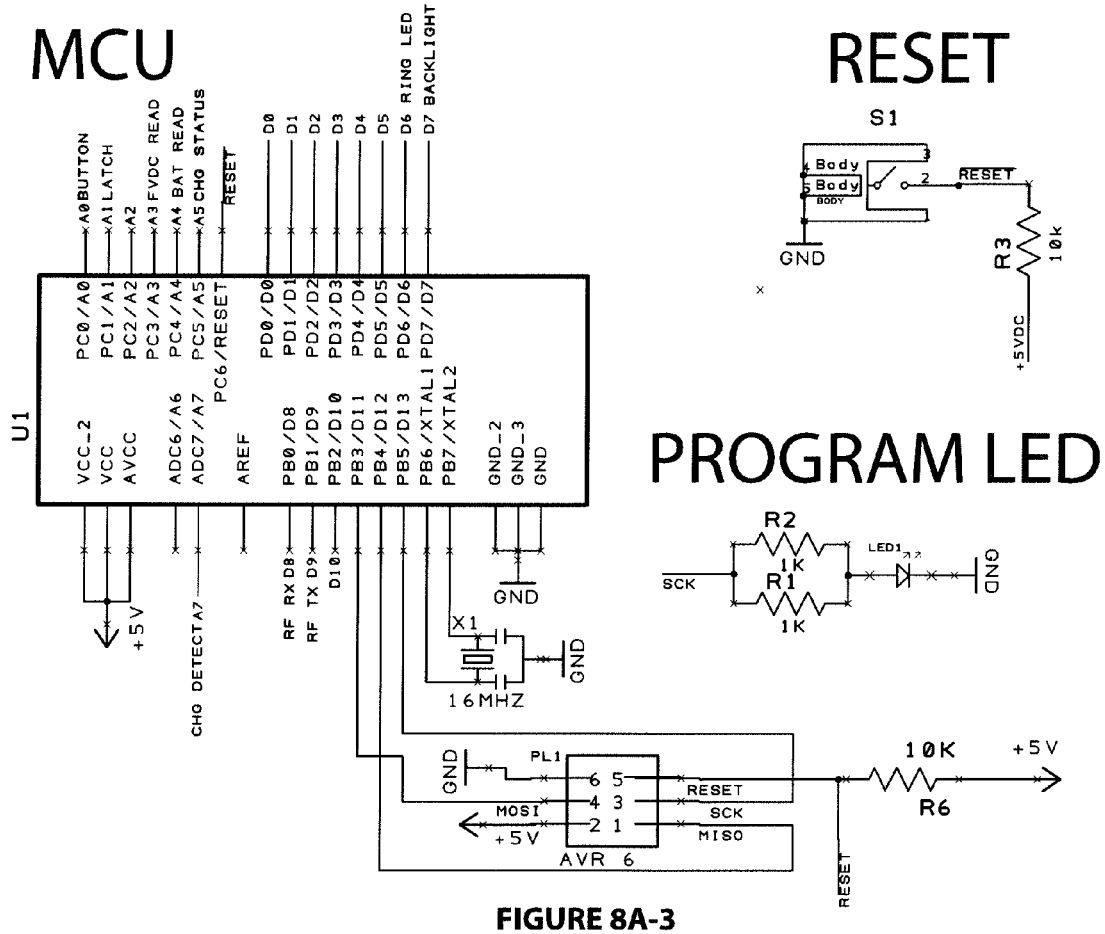
Figures 4, 8A:
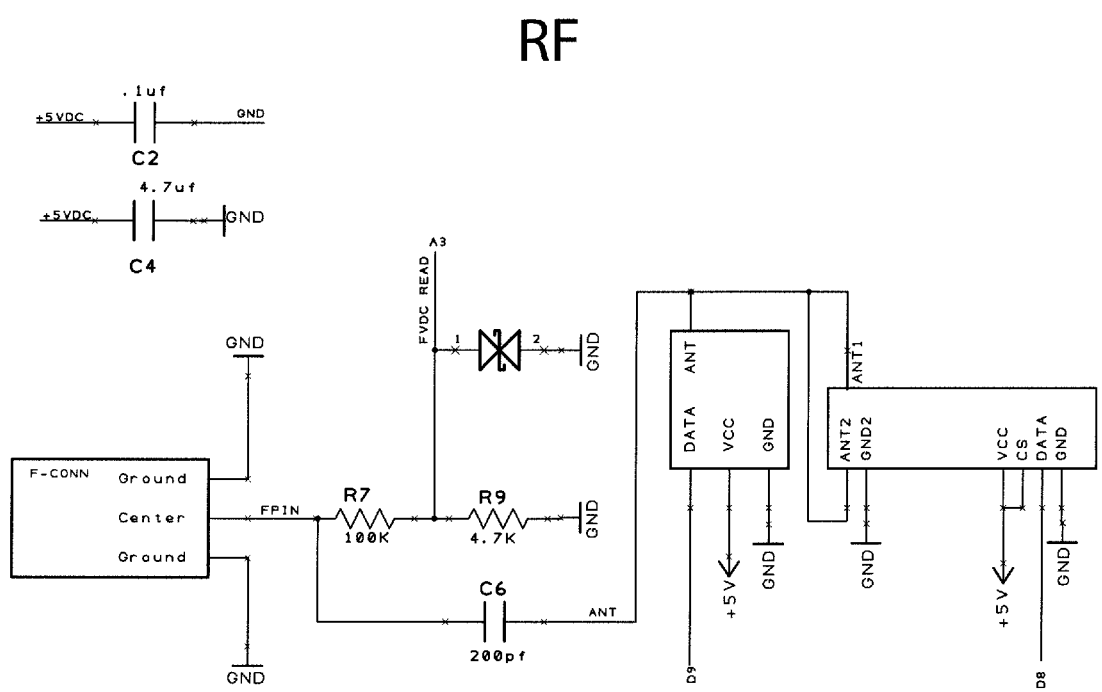
Figures 1, 8B:
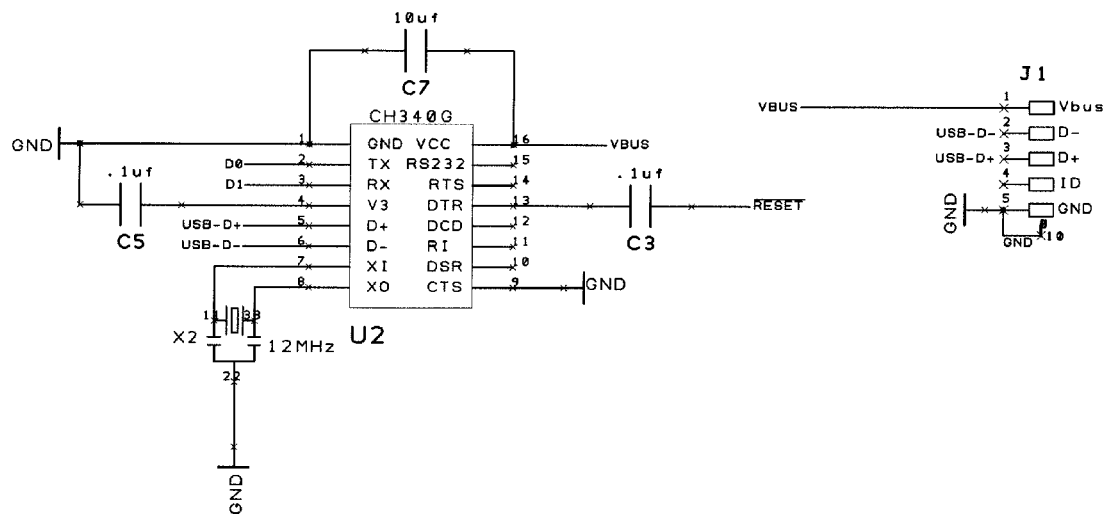
Figures 2, 8B:
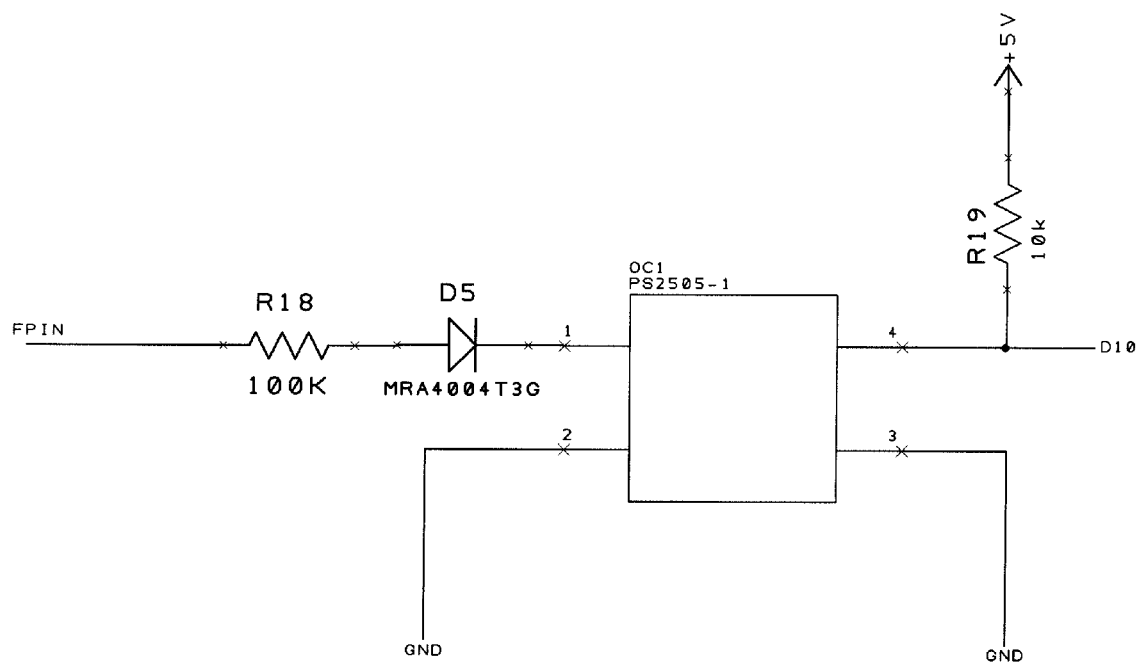
Figures 3, 8B:
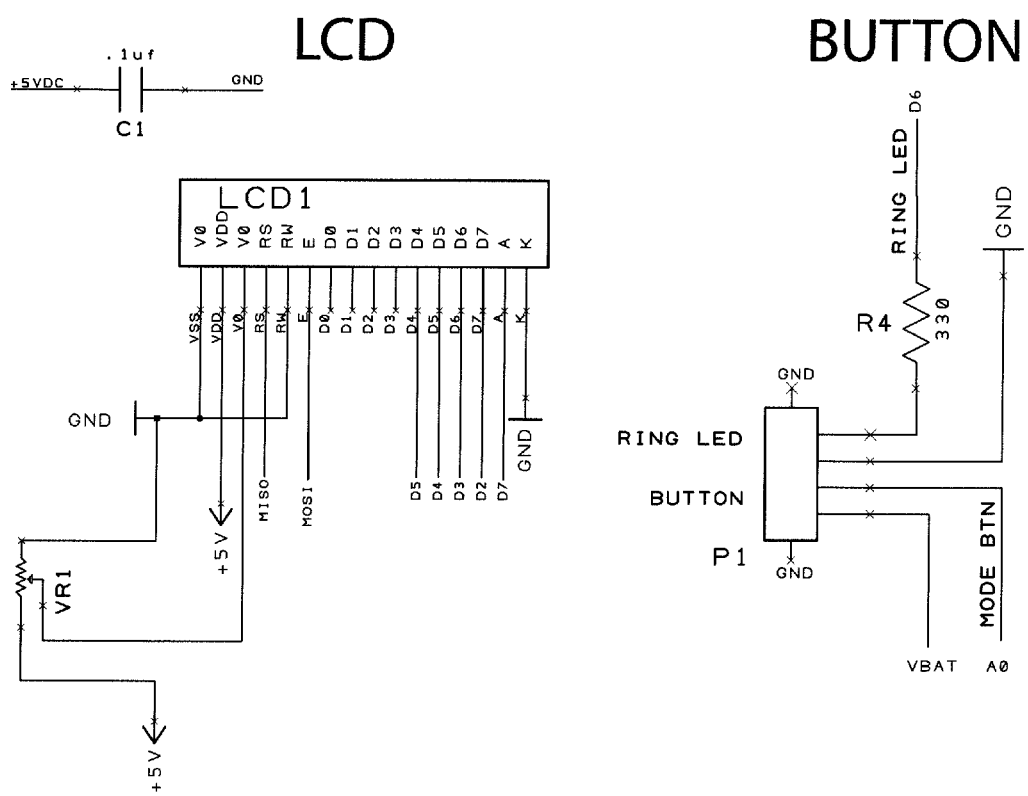

Referring again to FIG. 3, the circuit board 330 comprises: a radio frequency (RF) transmitter 332; a radio frequency (RF) receiver 334; a microcontroller 336; a connector 338; an LED indicator 340; and a power switch 342. Circuitry for the link or communication node 300 is exemplified in FIGS. 8A and 8B.

The connector 338 can be any connector that is capable of working with radio frequency (RF) signals and has appropriate shielding. For example, the connector 338 is a male F connector. However, it will be evident to a person skilled in the art that the connector 338 can be any connector that can be adapted, replaced and exchanged with an existing connector on the circuit board 330 for matching required industrial applications.

The system 1000 is in operation when the central communication unit 200 is switched ON using the power switch 280 and the communication node/nodes 300 are switched ON using the power switch 342.

In operation, the central communication unit 200 provides for taking a reading on a signal distribution line associated with one or more communication nodes 300 as to whether voltage already exists on the signal distribution line. If the central communication unit 200 identifies pre-existing voltage on the signal distribution line, the display screen 250 illustrates the voltage on the signal distribution line. Next, the central communication unit 200 moves on to identifying the one or more communication nodes 300. Also, when the central communication unit 200 identifies a communication node 300 and earlier identified pre-existing voltage, the display screen will denote an identification number associated with the node and an icon "X" for the identified communication node 300 denoting pre-existing voltage. Such an illustration on the display screen 250 assists a user to identify that the signal distribution line/cable path between the central communication unit 200 and the communication node 300 has pre-existing voltage. This can be integral for certain industry applications.

If the central communication unit 200 does not identify pre-existing voltage on the signal distribution line, the central communication unit directly moves on to identifying the one or more communication nodes 300. When the CCU 200 verifies or identifies each communication node 300 connected to it, the CCU 200 verifies that any desired signal will reach its termination point on the line being tested.

In operation, in this embodiment, the central transmitter 232 of the central communication node 200 transmits an information packet (in form of an encoded transmission) at a pre-determined request frequency to one communication node 300 at a time. For example, in the cable TV and satellite TV industry, the information packet may be transmitted at a pre-determined request frequency of 434 Mega Hertz (MHz). It will be evident to a person skilled in the art that the information packet can be sent at other frequencies relevant in the cable TV and satellite TV industry. Also, it will be evident to a person skilled in the art that, the system can employ different request frequencies for application in different industries. The specific frequency used can be prudently selected given the specific context of the operating environment.

The central communication node 200 transmits the information packet to a location (wherein a communication node 300 may be present) for a pre-determined amount of transmission time and then listens for a pre-determined amount of listening time, before moving onto a next location for identifying the next communication node 300. For example, in one embodiment, the transmission time is one (1) second and the listening time is one (1) second. However, it will be evident to a person skilled in the art that the transmission time and listening time can vary without compromising on the time efficiency, while removing false positive opportunities.

If a communication node 300 is present at the location, then the radio frequency (RF) receiver 334 of the communication node 300 receives the information packet; and the radio frequency (RF) transmitter 332 of the communication node 300 sends a corresponding response packet (in form an encoded transmission) to the central communication 200 at a pre-determined response frequency. At the central communication unit 200, the response packet is received by the central receiver 234. For example, in the cable TV and satellite TV industry, the response packet is transmitted at a pre-determined request frequency of 315 MHz. It will be evident to a person skilled in the art that the response packet can be sent at other frequencies relevant in the cable TV and satellite TV industry. Also, it will be evident to a person skilled in the art that, the system can employ different request frequencies for application in different industries.

In the operation mode, when a communication node 300 is switched ON, the communication node 300 sits in an "information receiving" mode waiting for a request packet (any encoded message, perhaps consisting of Boolean operators or characters, for example) from the central communication unit 200. When the communication node 300 receives a request packet, the communication node 300 responds by sending a response packet (any encoded message, perhaps consisting of various Boolean operators or characters, for example) and a small "test" voltage down the cable, thereby assessing the state of the line as "voltage passing" or "voltage blocking". Thereafter, the communication node 300 resets itself waiting for the next request packet. Alternatively, when the communication node 300 does not receive a request packet, the communication node can auto-shift from the "operational mode" to "sleep mode" and back as required. As used herein, the request packet is in the form of an encoded transmission to improve accuracy and for substantially reducing the false positives. Also, as used herein, the response packet is in the form of an encoded transmission to improve accuracy and for substantially reducing the false positives.

On receiving the response packet, the microcontroller 236 of the central communication unit 200 processes the information in the response packet to identify if voltage is passing/blocking/not present on the associated cable network/signal distribution line. This may be accomplished by transmitting a relatively smaller voltage such as five VDC. If this test voltage is not returned, then the state of the line being tested is identified as "b" or "blocked". If it is returned, then the state of the line is identified as "p" or "passing". Such corresponding information is formatted in the form of an icon that is displayed to a user on the display screen 250. The icon displayed illustrates voltage status along with identification of the communication node 300. Once a particular communication node 300 is identified, the central communication unit 200 moves on to identifying another communication node 300.

If the central communication unit 200 receives a pre-determined voltage from the communication node 300, the display screen 250 illustrates a passing (passive) voltage icon "P" along with the identified communication node 300. Next, the central communication unit 200 moves on to identifying the next communication node 300. Such an illustration on the display screen 250 assists a user to identify that that the signal distribution line/cable path between the central communication unit 200 and the communication node 300 is voltage passing. Specifically, a blocking device or any other blocking situation is not present.

If the central communication unit 200 receives no voltage (or less than the expected voltage) from the communication node 300, the display screen 250 illustrates a blocking voltage icon "B" along with the identified communication node 300. Next, the central communication unit 200 moves on to identifying the next communication node 300. Such an illustration on the display screen 250 assists a user to identify that the signal distribution line/cable path between the central communication unit 200 and the communication node 300 is blocking voltage. Specifically, a blocking device or any other blocking situation is existent. This then indicates that something on the line blocks voltage, even though the line is connected from an initial point "a" to its termination point.

If after the listening time, a communication node 300 is not identified at a particular location, the display screen 250 is only a blank illustration. Thereafter, the central communication unit 200 starts searching for a next communication node 300 at another location. The process can be repeated continuously, at specified periods of time, or whenever else desired by the applicable user.

The system 1000 of the present invention provides for reading the highest voltage on the associated cable line—dependent on the associated voltage detection circuitry—70 VDC for example. Such information is useful for installers as they conduct their work.

Also, the system 1000 of the present invention provides for using only one conductor, thereby resulting in a simpler design. The use of a single conductor by the present invention provides for mapping through even severed shielding and through partially worn out/torn out/cut cables. Also, use of a single conductor provides for mapping through water logged cables. Due to other configurational simplicities, the present invention provides for a much smaller unit as compared to signal generators.

As discussed above the system of the present invention can efficiently provide for mapping signal distribution networks through components that block voltages and through active and dark systems, thereby providing for a wider versatile usage. In this regard the system 1000, can also work over long distance cable lines. Finally, due to the simplicity of the design and less number of components required, the system of the present invention provides for a cost-efficient and time efficient solution for mapping of signal distribution networks.

Figure 4:
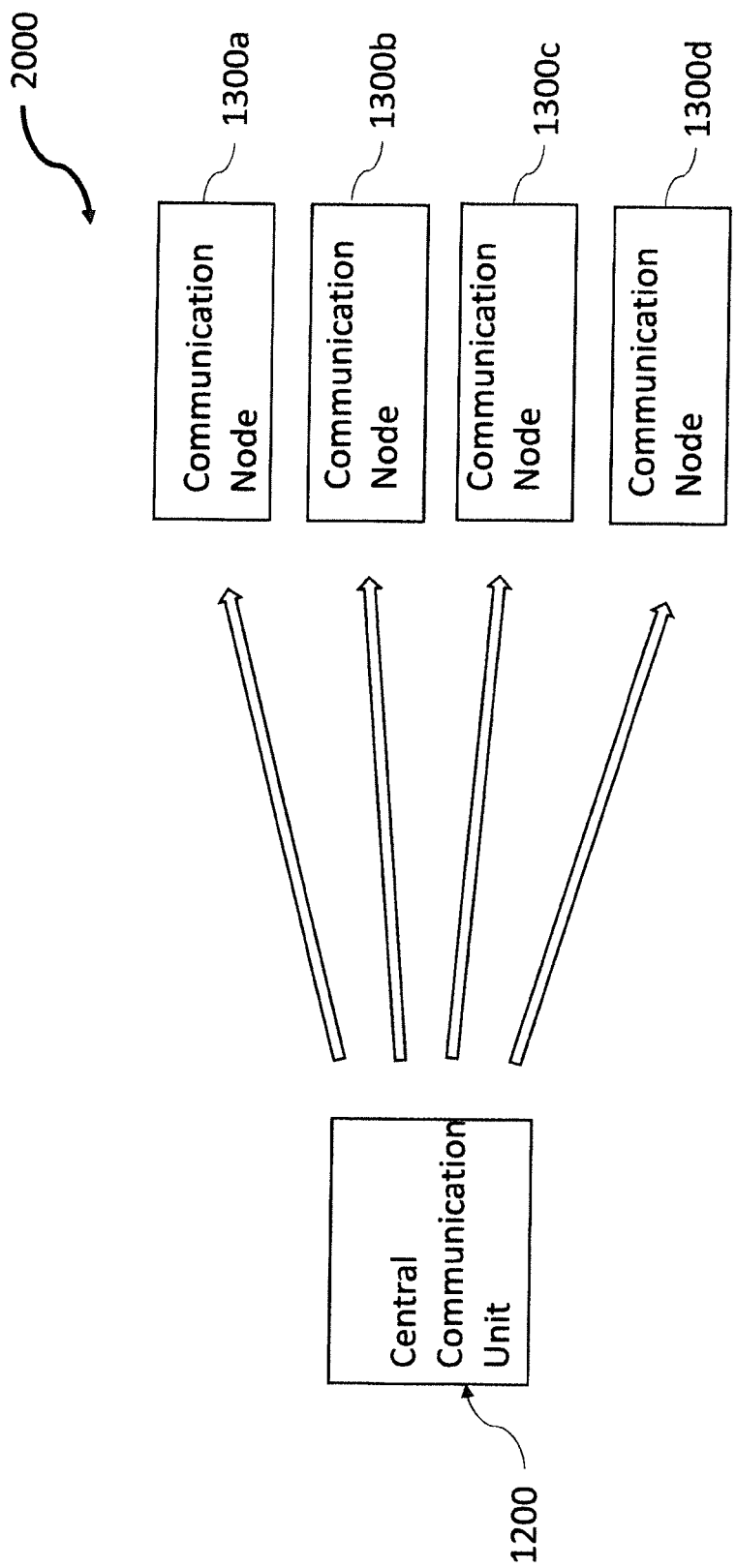
FIG. 4 illustrates a uni-directional system for mapping a signal distribution network, according to an exemplary second embodiment of the present invention.

In a second embodiment, as shown in FIG. 4, a system for mapping of signal distribution networks 2000 (hereinafter referred to as system 2000) is illustrated. The system 2000 comprises: a central communication unit 1200; and a plurality of communication nodes 1300a, 1300b, 1300c, and 300d (collectively referred to as communication node/nodes 1300). As discussed above, the communication nodes 1300 are installed at locations wherein the mapping of signal distribution/cable networks is required. Such locations include, but are not limited to, wall outlets, devices, and coaxial cables.

In this embodiment, when in operation, the central communication unit 1200 is capable of transmitting an information packet at a pre-determined request or otherwise known frequency to the communication nodes 1300. The communication nodes 1300 are capable of receiving the information packet and signalling to a user of the CCU 1200 that the central communication unit and the communication nodes are on same signal distribution system. In this embodiment, the central communication unit 1200 communicates with the communication nodes 1300 uni-directionally. See FIGS. 4 and 10 for exemplifying uni-directional flow. Also, in this embodiment, the present invention addresses all communication nodes simultaneously.

Figure 5:
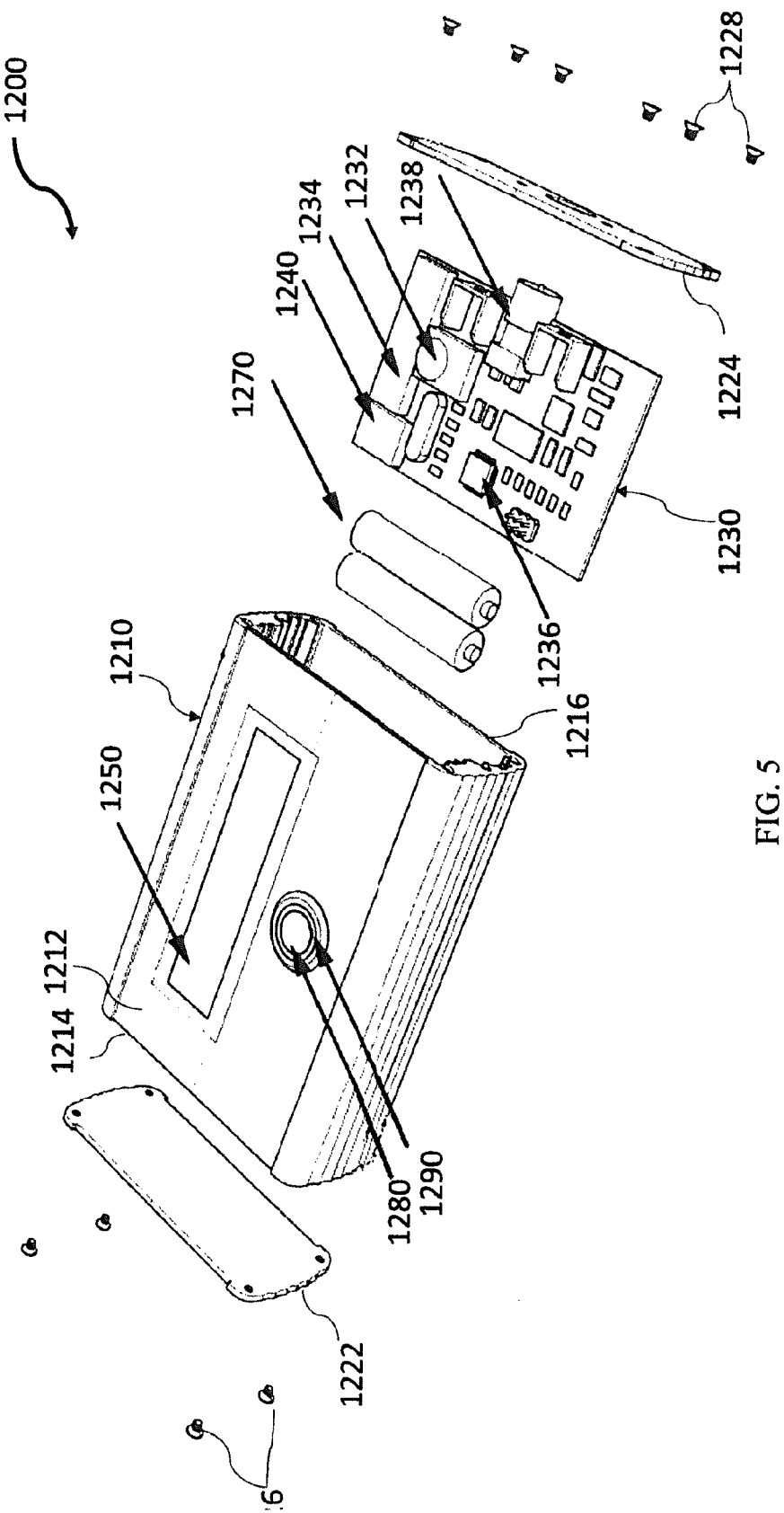
FIG. 5 illustrates a central communication unit of the system of FIG. 4.

The central communication unit 200 is similar to the central communication unit 1200. Referring to FIG. 5, the central communication unit 1200 comprises: a central housing 1210; a central circuit board 1230 installed inside the housing 1210; a receiver screen or display screen 1250 embedded on a top surface 1212 of the central housing 1210; a power switch 1280 and an LED indicator unit 1290 embedded on the top surface 1212 of the central housing 1210. Additionally, the central communication unit 1200 comprises power supply in form of one or more batteries 1270 installed inside the central housing 1210.

The central housing 1210 comprises: a first side cover 1222 for covering a first side 1214 of the central housing 1210; and a second side cover 1224 for covering a second side 1216 of the central housing 1210. The first side cover 1222 is detachably engaged to the first side 1214 using screws 1226 that fit into corresponding slots on the first side 1214 of the central housing 1210. Similarly, the second side cover 1224 is detachably engaged to the second side 1216 using screws 1228 that fit into corresponding slots on the second side 1216 of the central housing 1210. The detachable engagement of the first and second side covers 1222, 1224 with the first and second sides 1214, 1216 allows for introduction and removal of circuit board 1230 and the batteries 1270 from the central housing 1210. It will be evident to a person skilled in the art that the mechanism for detachable engagement is not limited to the mechanism illustrated in FIG. 5. Also, it will be evident to a person skilled in the art that the present invention is not limited to shape of the central housing 1210 or the configuration of the components therein.

Referring again to FIG. 5, the central circuit board 1230 comprises: a central radio frequency transmitter 1232; a central radio frequency receiver 1234; a microcontroller 1236; a connector 1238; and a mode dip switch 1240.

The connector 1238 can be any connector that is capable of working with radio frequency (RF) signals and has appropriate shielding. For example, the connector 1238 is a male F connector. However, it will be evident to a person skilled in the art that the connector 1238 can be any connector that can be adapted, replaced and exchanged with an existing connector on the central circuit board 1230 for matching required industrial applications.

Figure 6:
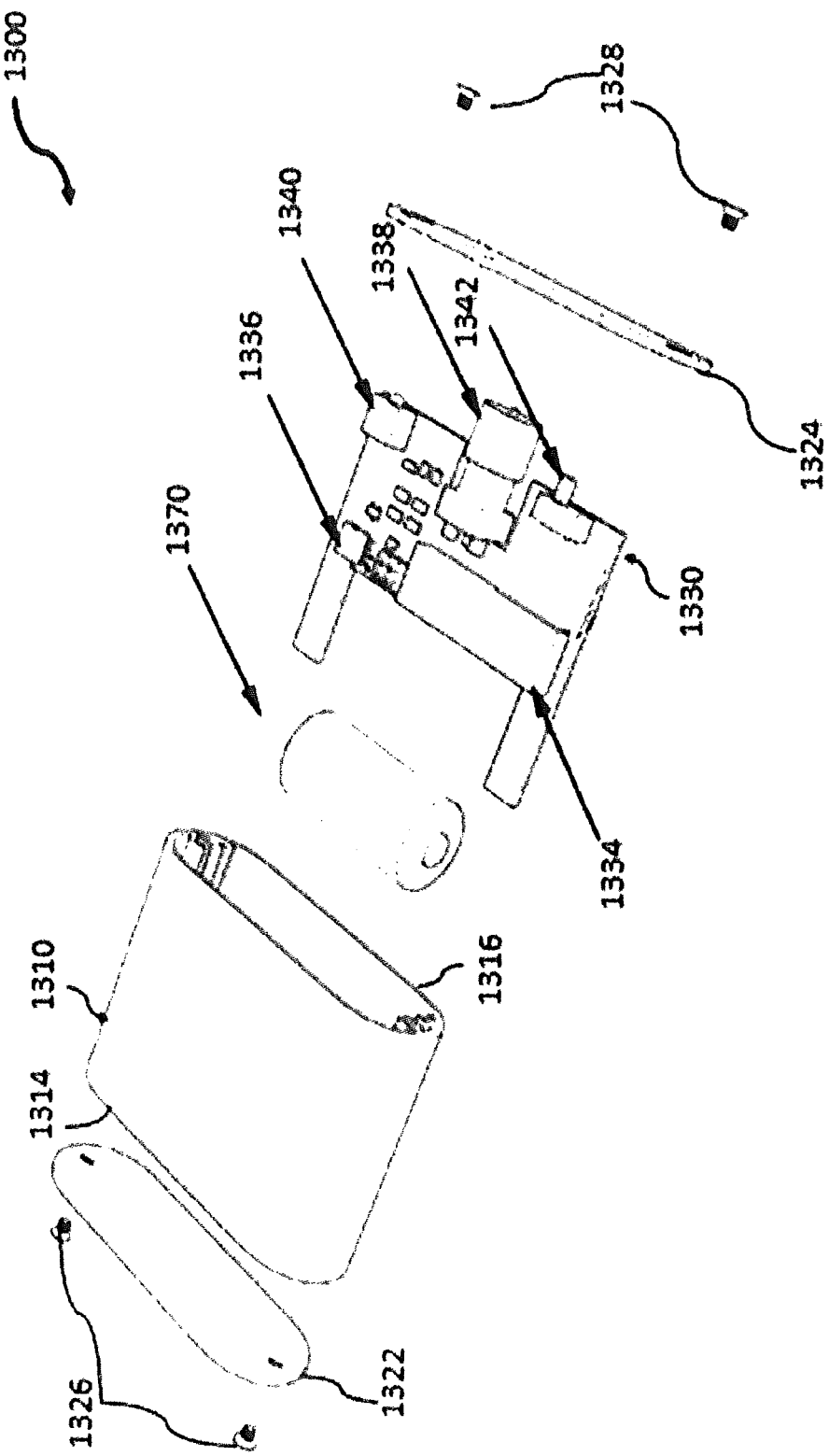
FIG. 6 illustrates a communication node of the system of FIG. 4.

Referring to FIG. 6, communication node 1300 comprises: a housing 1310; and a circuit board 1330 installed inside the housing 1310. Additionally, the communication node 1300 comprises power supply in form of one or more batteries 1370 installed inside the housing 1310.

The housing 1310 comprises: a first side cover 1322 for covering a first side 1314 of the housing 1310; and a second side cover 1324 for covering a second side 1316 of the housing 1310. The first side cover 1322 is detachably engaged to the first side 1314 using screws 1326 that fit into corresponding slots on the first side 1314 of the housing 1310. Similarly, the second side cover 1324 is detachably engaged to the second side 1316 using screws 1328 that fit into corresponding slots on the second side 1316 of the housing 1310. The detachable engagement of the first and second side covers 1322, 1324 with the first and second sides 1314, 1316 allows for introduction and removal of circuit board 1330 and the batteries 1370 from the housing 1310. It will be evident to a person skilled in the art that the mechanism for detachable engagement is not limited to the mechanism illustrated in FIGS. 8A-1 through 8A-4 and FIGS. 8B-1 through 8B-3. Also, it will be evident to a person skilled in the art that the present invention is not limited to shape of the housing 1310 or the configuration of the components therein.

Referring again to FIG. 6, the circuit board 1330 comprises: a radio frequency (RF) receiver 1334; a microcontroller 1336; a connector 1338; an LED indicator 1340; and a power switch 1342. Optionally, the circuit board 1330 may comprise a radio frequency (RF) transmitter 1332 (such as, transmitter 332 of the communication node of the first embodiment). In such a case, the communication node 1300 can operate in both the modes of the first embodiment and the second embodiment. However, in applications wherein it is only envisioned for operation in the mode of the second or uni-directional embodiment, a transmitter is not required in the communication node 1300.

The connector 1338 can be any connector that is capable of working with radio frequency (RF) signals and has appropriate shielding. For example, the connector 1338 is a male F connector. However, it will be evident to a person skilled in the art that the connector 1338 can be any connector that can be adapted, replaced and exchanged with an existing connector on the central circuit board 1330 for matching required industrial applications.

The system is in operation when the central communication unit 1200 is switched ON using the power switch 1280 and the communication node/nodes 1300 are switched ON using the power switch 1342.

In operation, in this embodiment, the central transmitter 1232 of the central communication node 1200 transmits an information packet (in form of an encoded transmission) at a pre-determined request frequency to each of the communication nodes 1300. For example, in the cable TV and satellite TV industry, the information packet is transmitted at a pre-determined request frequency of 434 Mega Hertz (MHz). It will be evident to a person skilled in the art that the information packet can be sent at other frequencies relevant in the cable TV and satellite TV industry. Also, it will be evident to a person skilled in the art that, the system can employ different request frequencies for application in different industries.

When the communication nodes 1300 receive the information packet, the LED indicator 1340 flashes in a unique manner indicating to the user (for example, a service technician) that the central communication unit 1200 and the communication nodes 1300 are on same signal distribution network.

Also, the present invention provides a method for mapping a signal distribution network. The method comprises: transmitting an information packet at a pre-determined or otherwise known request frequency by a central communication unit to at least one communication node or to one communication node at a time of a plurality of communication nodes; receiving and processing the information packet by the communication node; sending a response packet by the communication node to the central communication unit at a pre-determined response frequency; and processing the response packet and providing information by the central communication unit to a user on the identified communication node and the voltage on a signal distribution line associated with the identified communication node.

EXAMPLE 1

Operation of the Present Mapping System

Figure 11:
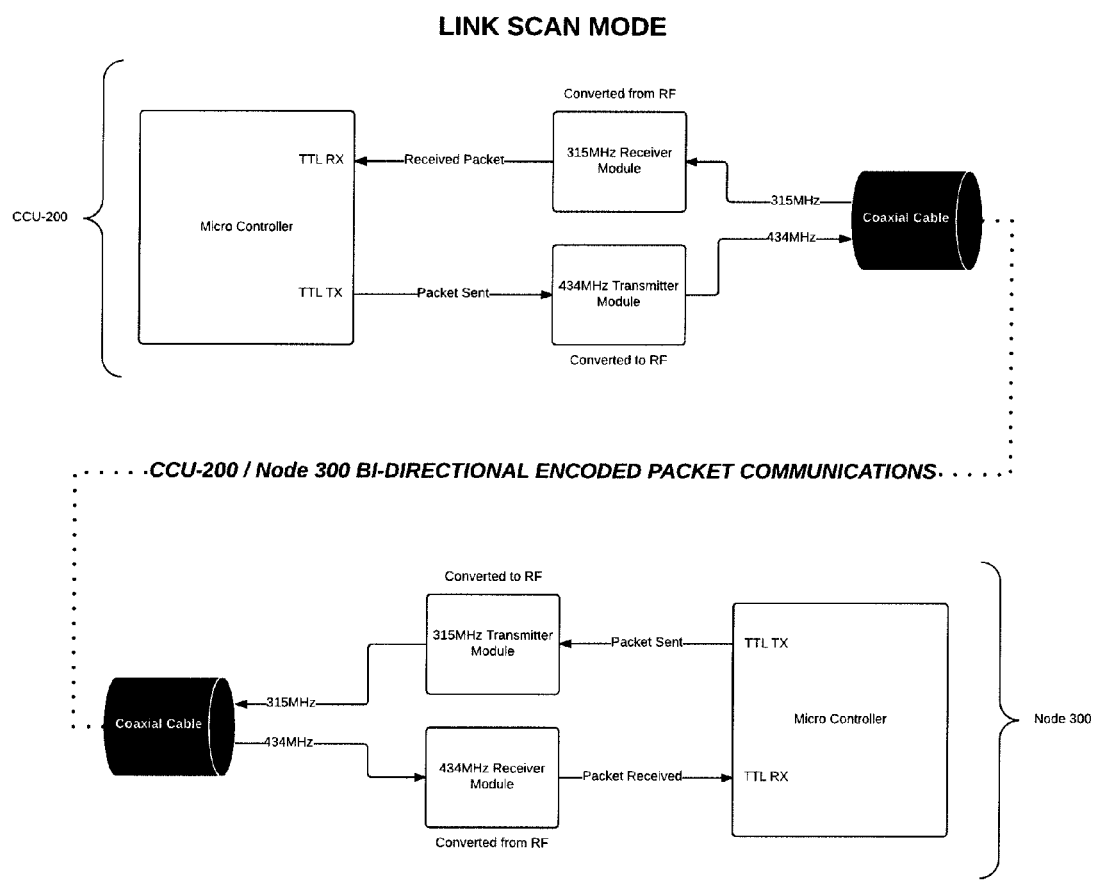
FIG. 11 schematically illustrates a Link Scan mode of the present mapping systems.

The following represents one embodiment of the present invention, as programmed in accordance with the present invention, with bi-directional communication between the CCU 200 and one or more communication nodes 300:

1. Powering the Link or communication node 300: depress the "power" button until the light emitting diode (LED) display illuminates. The color of the LED at boot-up indicates the level of the battery as indicated by color coding or by other indication such as numerical values, for example. To illustrate, a green LED display may indicate a "good" battery power level; a yellow LED display may indicate a "getting low" battery power level; and a red LED display may indicate a "recharge soon" battery power level.
   a. Time-Out: By default the Link or communication node 300 will stay powered for 30 minutes and then automatically power itself down or essentially shut down. The automatic shutdown can be disabled by quickly double-tapping the aforementioned "power" button on the link or communication node 300. An indicator, such as a colored indicator purple for example, may serve to confirm that "Time-Out" is disabled. On the other hand, a blue indicator might for example serve to confirm that the unit will "Time-Out" thirty minutes from the time that the "power" button is depressed.
   b. Power-Down: the operator of the mapping system can manually power down the Link or communication node 300 by depressing the "power" button until the LED display indicates a power-down status, such as a red illumination of the LED display, for example. Shortly thereafter, the LED display is then discontinued or shut off indicating that the Link or node 300 is now powered down.
2. Powering on the Receiver or CCU 200: The CCU 200 is powered on by depressing the "power" button on the receiver. Upon acquiring power, the CCU 200 will immediately enter the "link scan mode" wherein the receiver begins its program.
3. Powering Down: The CCU 200 is powered down with a quick double "power" button push or by quickly depressing the "power" button two times in succession.
4. Changing Modes: Depressing the "power" button changes the mode on the receiver or CCU 200. Three modes, explained below, may individually or collectively be provided in various embodiments: a) Link Scan; b) Screamer Mode; and c) F Voltage Meter (DC).
5. Link Scan Mode: The receiver of the CCU 200 will attempt to communicate with all connected communication node(s) 300 and display their status on the receiver screen of the CCU 200. FIG. 11 provides an exemplary illustration of the Link Scan Mode. If the receiver of the central communication unit 200 successfully communicates with a communication node or link 300, the respective link's assigned identification number (e.g. 1-8) will be displayed on the receiver screen of the CCU 200, accompanied by a "b" indicating a "blocked" condition or a "p" indicating a "passing" condition. These and other CCU receiver indicia are explained immediately below:
   a. "b" indicates that the path between the receiver of the CCU 200 and the communication node or link 300 does not pass voltage, or passes an attenuated voltage, and therefore is considered to be "blocked".
   b. "p" indicates that the path between the receiver of the CCU 200 and the communication node or link 300 does pass voltage, and therefore is considered to be "passing". This would then be interpreted to mean that either there are not any components in the line, or, that there is a voltage passing component in the line such as a satellite splitter.
   c. a blinking "! " or exclamation point, alternating between the assigned number of the link or communication node 300 and the exclamation point, indicates that the respective link or communication node 300 under scrutiny needs to be charged and is low on power.
   d. If direct current (DC) voltage is found on the cable line at the time of booting up, the CCU 200 will display the respective voltage of the line on the display screen of the CCU 200. AC voltage, on the other hand, is not measured, but only detected. DC voltage is measured by reading and calculating the voltage between two resistors (i.e. a voltage divider).
   e. Re-scan: The Link Scan mode can be quickly be restarted at any time by depressing the "power" button for two (2) seconds. This presents an advantage when testing a large number of connections.
   f. Deep Scan Mode: While in Link Scan mode, the operator may press and hold the "power" button continuously for five (5) seconds (hold beyond Re-scan). The normal Link Scan mode only searches for each link or communication node 300 once. Deep Scan mode is initiated on the receiver CCU 200 and Deep Scan only looks for each communication node 300 once. This mode is especially useful with regard to systems that have substantial amounts of attenuation in the cable lines, or systems that have any type of interference in the lines.
      1. While in Deep Scan Mode, the scan time can be increased to 3, 4, and 5 minutes by holding the "power" button down for two (2) seconds for each increase.

g. Scan Results: When the Link Scan mode is completed, the CCU 200 provides an overview of the test results including the number of all transmitters or communication nodes 330 found; if more than one transmitter 300 is found, the CCU 200 displays a message that a "splitter/tap" is in line. If a transmitter or node 300 has a low battery, a message on the CCU 200 "charge battery" is displayed for that particular communication node 300.

EXAMPLE 2

Operation of a Second Embodiment of the Present Mapping System

Figure 12:
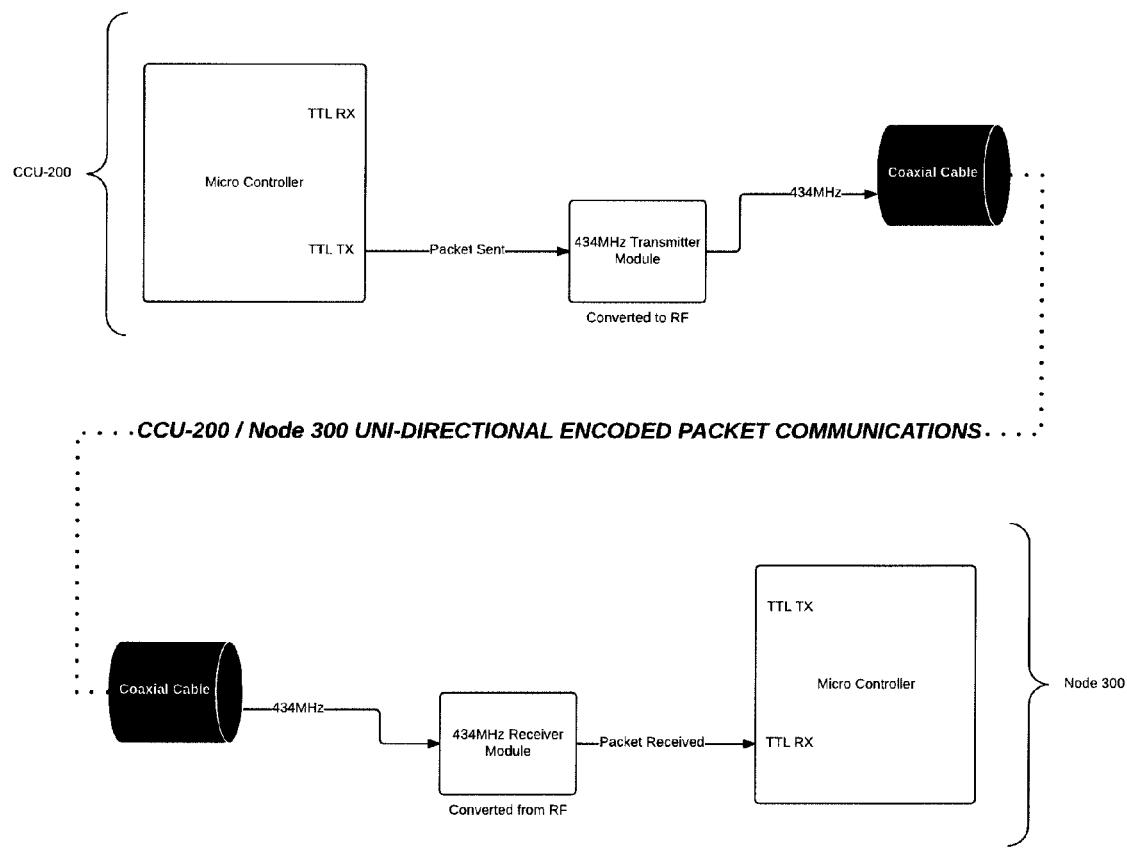
FIG. 12 schematically illustrates a Screamer mode of the present mapping systems.

The following represents yet another embodiment of the present invention, as programmed in accordance with the present invention with uni-directional communication between the CCU 200 and one or more communication nodes 300:

1. Screamer Mode: Screamer Mode utilizes a CCU 200 as explained in Example 1 with the distinction that the transmitter of the CCU 220 transmits a uni-directional 434 MHZ information packet to all connected links or communication nodes 300. There is no transmission back to the CCU 200 from any connected communication nodes 300. Rather, each connected link or communication node 300 receives the information packet from the CCU 200 and then flashes an indicia of being connected to the CCU 200, such as a white LED display on the display screen. One advantage of uni-directional communication is that the mapping system will function in high attenuation situations where the bi-directional Link Scan Mode simply does not function as well. This mode also advantageously maps unterminated cables by simply touching the subject coaxial cable's center conductor to a transmitter's 300 center pin. See FIG. 12 for an exemplary illustration of a Screamer mode of the present invention.
   a. 434 MHz signal: the CCU 200 screamer mode preferably employs a 434 MHz signal that can be detected by virtually any CATV (community access television) cable meter. In this way, a loss of signal may be calculated between point A and point B along a given CATV cable.
   b. Time-Out: By default, Screamer Mode is programmed to time-out and shut down after fifteen (15) minutes. This time can be increased to thirty, forty-five, and sixty minutes by depressing the "power" button for two (2) seconds.

EXAMPLE 3

Operation of a Third Embodiment of the Present Mapping System

Figure 13:
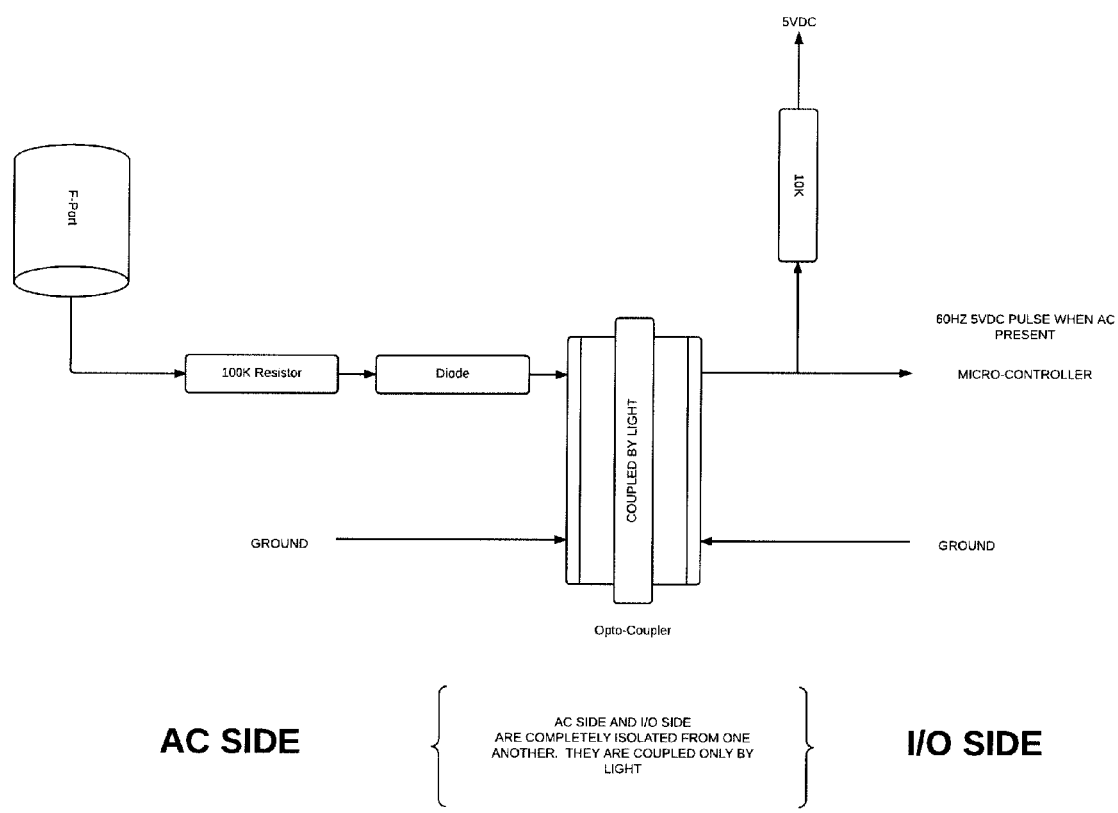
FIG. 13 schematically illustrates an AC voltage detection circuit of the present mapping systems.

A third exemplary embodiment incorporates the features of either the first or second embodiment and one or more of the following additional modes:

1. F Voltage Read Mode: this mode facilitates reading of direct current (DC) voltage up to 70 VDC. This mode is useful for CATV technicians that want to confirm the DC power adapter going to an associated amplifier is working properly. This is also useful to satellite TV installers that may need to determine if an LNB or low noise block has voltage, or if an associated injector is working properly. An injector is a device which typically has three ports: a signal in, a signal out, and a voltage in. This device allows voltage to be injected onto a cable system on the same cable that is supplying the signal. Most times this is for powering devices on the line.
2. Alternating Current (AC) Voltage Detection: This mode detects and displays a warning if AC voltage is present, preferably immediately upon activation or powering up of the CCU 200. FIG. 13 provides an exemplary illustration of an alternating current (AC) voltage detection circuit, in accordance with the present invention.

EXAMPLE 4

Programming of the Present Mapping System

Figure 9:
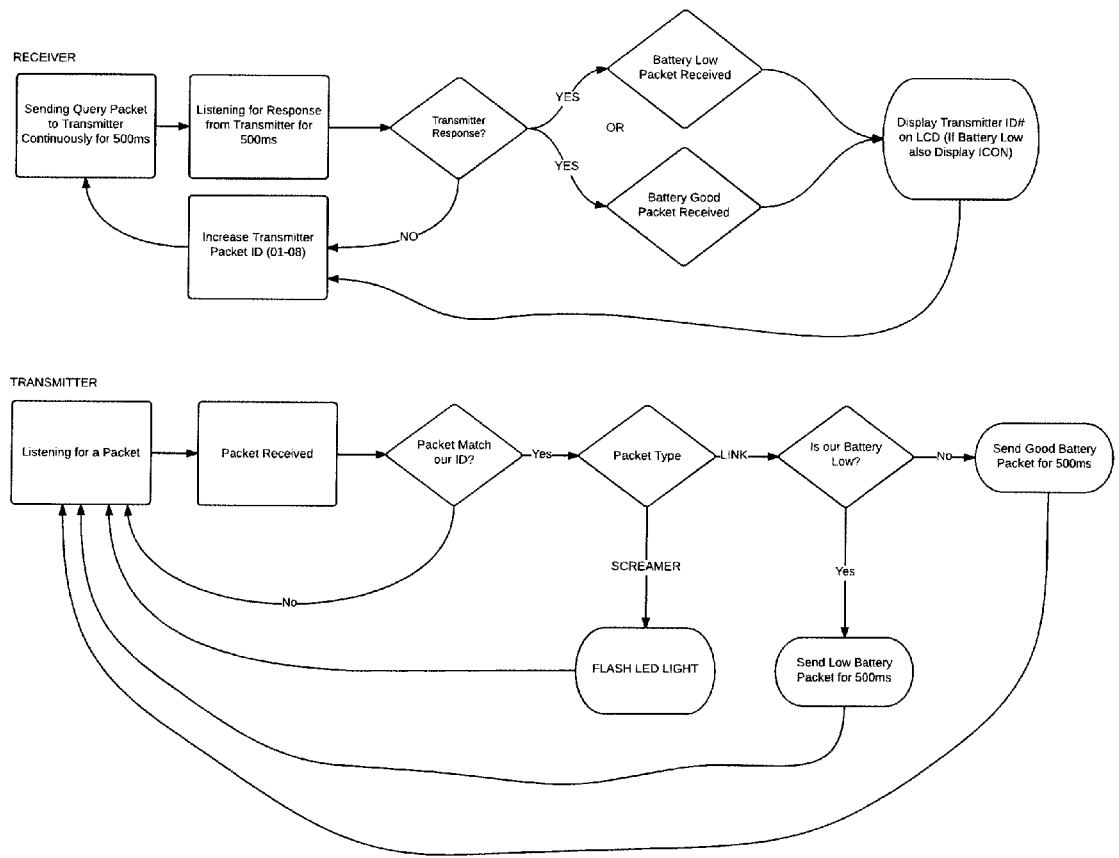
FIG. 9 schematically illustrates a mapping system of the present invention, wherein both bi-directional and uni-directional modes are illustrated.
Figure 10:
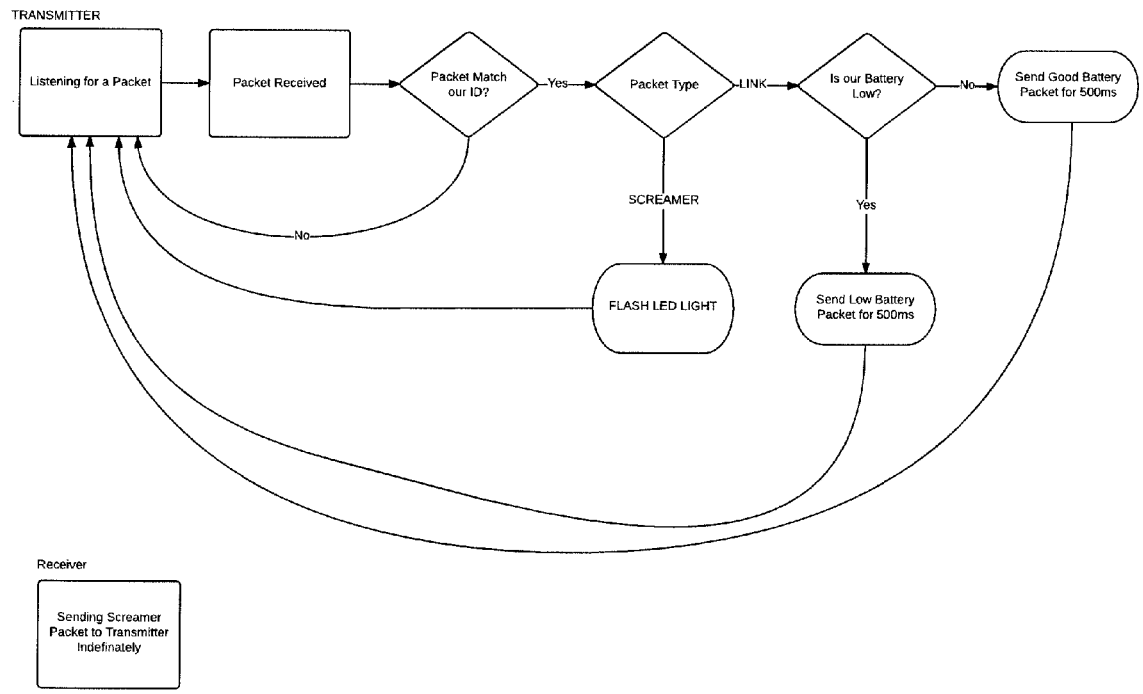
FIG. 10 schematically illustrates a uni-directional mapping system of the present invention.

The transmitter or communication node 300 and the receiver CCU 200 are both programmed in C++ and Arduino (a variation of C++), both of which are known in the art. The transmitters and receivers have a universal serial bus, USB to transistor transistor logic, TTL, integrated circuit, IC that allows the main microcontroller to be programmed through the USB port. The microcontroller requires a specific boot-loader to be installed for the USB to TTL IC to communicate properly with the microcontroller. The boot-loader prepares the chip of the micro-controller for the present program(s) and is uploaded to the microcontroller using an Atmel AVR MKII programmer and the Arduino software. Once the boot-loader is successfully on the chip, the program or software is uploaded via the USB connector. The software or program can be installed using the Arduino software or several other microcontroller firmware update tools. FIGS. 9 and 10 exemplify the general tasks that are programmed into the system that is into both microcontrollers of cards 230 and 330. As described herein, other tasks, such as the battery checks may also be programmed as desired.

The microcontroller 236 of the CCU 200 and the microcontroller 336 of the link 300 actually sends pre-determined or pre-programmed request and response packets, respectively. Each discrete link 300 would have its own identifier to be associated with its discrete pre-programmed request and response packet information.

EXAMPLE 5

Packet Informative Related to the Present Mapping System

The receiver communicates with the transmitters by sending a packet of information (e.g. the response packet) that is programmed in the respective microcontroller in electronic communication with the transmitter. The packet may consist of an encoded DECIMAL from 00-99 (encoding type is not critical). For each transmitter or node 300, the receiver CCU 200 sends this packet numerous times over a predetermined amount of time to each communication node 300, and then listens for a response packet for a predetermined amount of time from those respective nodes 300. Every node 300 is looking for a packet being specifically addressed to its own ID (e.g. 1-8). If the communication node 300 identifies a packet with an ID that does not correspond to its own ID, or that corresponds to another node 300, it does nothing. It waits in standby until its ID is called or identified. If a packet is received that is specifically addressed to the communication node's 300 ID, it responds to the receiver to provide the requisite response (to let it know of its presence).

The packet is essentially the same or similar for all transmissions. The primary difference is the DECIMAL (00-99) that the transmitter is sending in the information packet. For example, in a plurality of transmitters, Transmitter ID #1 may simply have a 01 encoded packet.

The transmitter or CCU, in communication with the microcontroller, will utilize different information packets for a transmitter notifying an associated receiver or communication node, that it has a low battery, screamer mode, and so forth.

EXAMPLE 6

Exemplary Schematic of a Central Communication 200 Unit of the Present Mapping System FIG. 7 schematically exemplifies the electronic configuration of one embodiment of a central communication unit 200 of the present invention.

EXAMPLE 7

Exemplary Schematic of a Link or Communication Node 300 of the Present Mapping System FIG. 8 schematically exemplifies the electronic configuration of one embodiment of a link or communication node 300 of the present invention.

EXAMPLE 8

Exemplary Flow Chart of the Function of a Bi-Directional Embodiment of the Present Mapping System FIG. 9 schematically exemplifies the flow chart of a bi-directional system as also exemplified by the description in Example 1.

EXAMPLE 9

Exemplary Flow Chart of the Function of a Uni-Directional Embodiment of the Present Mapping System FIG. 10 schematically exemplifies the flow chart of a uni-directional system as also exemplified by the description in Example 2 and by FIG. 4.

The mapping systems of the present invention utilize links or communication nodes that are readily charged by AC power, using standard cables and rechargeable battery circuitry. Indicia on the screen display of the CCU 200, such as a pulsing red display on the LED display screen to indicate a charging mode, or, such as a green LED display to indicate a fully charged communication node or link may be utilized in various embodiments. The CCU 200 may be charged in the same manner, again with respective indicia on the display screen indicating the status of the battery charge. When fully charged, the CCU 200 can operate for about eight (8) hours until a battery charge is again required. When fully charged, each link or communication node 300 can operate for about twenty-four (24) hours until a battery charge is again required.

The present systems by and through the CCU 200 preferably utilize a relatively high radio frequency output of about +55 dB to communicate over even the most highly attenuated systems. Accordingly, the present systems are to be used in conjunction with properly shielded cable systems. If the system is used on a system with poor shielding, or any type of connected antenna, the CCU 200 can potentially pick up the links 300 even if they are not connected.

As mentioned above, because of the high radio frequency (RF) output of about +55 dB, the links 300 should preferably be connected at least six (6) feet away from the CCU 200. Furthermore, maximum distances will be iteratively determined based on the quality of cable being tested. For example, as the power is increased, greater transmission and reception distances are facilitated. At a radio frequency of about +61 dB, and 434 MHz transmitted across RG6 cable, the power loss or drop across 100 feet of cable is about 4 dB, thereby facilitating a maximum testing distance of about 1500 feet. On the other hand, if RG11 cable is employed, and at a radio frequency of about +61 dB, a 434 MHz signal transmitted across this cable would result in a power loss or drop across 100 feet of cable at about 2.5 dB, thereby facilitating a maximum testing distance of about 2440 feet.

Although only particular exemplary embodiments of the invention have been disclosed for illustrative purposes, it will be recognized to those skilled in the art that variations or modifications of the disclosed invention, including the rearrangement in the configurations of the parts, changes in sizes and dimensions, and variances in terms of shape, for example, may be possible. Accordingly, the invention is intended to embrace all such alternatives, modifications and variations as may fall within the spirit and scope of the present invention.

The foregoing descriptions of specific embodiments of the present invention have been presented for purposes of illustration and description. They are not intended to be exhaustive or to limit the invention to the precise embodiments disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is understood that various omissions, substitutions of equivalents are contemplated as circumstance may suggest or render expedient, but is intended to cover the application or implementation without departing from the spirit or scope of the claims of the present invention.

The invention claimed is:

1. A system for mapping a signal distribution network comprising:
   a central communication unit; and
   a plurality of communication nodes installed at a plurality of known locations;
   at least one communication node comprising a unique identifier, said at least one communication node installed apart from said central communication unit;
   wherein the central communication unit and the plurality of communication nodes are configured for requesting and sending mapping information over a plurality of known frequencies to map the signal distribution network at the known locations;
   wherein the central communication unit is configured for requesting and sending mapping information over a known frequency to map the signal distribution network at each of said plurality of communication nodes, and, each of said plurality of communication nodes are configured for processing said mapping information to provide information to a user of said system, and wherein the central communication unit and the at least one communication node may communicate based on an information packet transmitted by said central communication unit on said known frequency, so long as the at least one communication node exists on the same signal distribution network as the central communication unit, and, said at least one communication node may transmit said unique identifier to said central communication unit, wherein said unique identifier when received by said central communication unit may locate said at least one communication node, and wherein the central communication unit is configured for transmitting a test voltage to determine whether the signal distribution network is voltage blocking or voltage passing between the central communication unit and each of said at least one communication node, and wherein each of the plurality of communication nodes are programmed to respond to a programmed respective request from said central communication unit, and, each of said plurality of communication nodes contains a unique identifier for transmission to said central communication unit, for location of each of said plurality of communication nodes in response to sending a test voltage to assess the state of an associated line as voltage passing or voltage blocking.

2. The system of claim 1, wherein the plurality of known locations is a plurality of predetermined locations and wherein the plurality of known frequencies is a plurality of predetermined frequencies.

3. The system of claim 1 wherein said central communication unit and said at least one communication node communicate by radio frequency bi-directionally.

4. The system of claim 1 wherein said central communication unit communicates uni-directionally by radio frequency with said at least one communication node.

5. A system for mapping signal distribution networks, comprising:
   a central communication unit; and
   a plurality of communication nodes installed at known locations, wherein the plurality of communication nodes are in bi-directional communication with the central communication unit;
   wherein the central communication unit is configured for transmitting an information packet at a known request frequency to one communication node at a time, and
   wherein each communication node is configured for receiving and processing the information packet and sending a response packet to the central communication unit at a known response frequency, said response packet providing an identifier of said communication node, and
   wherein the central communication unit is configured for processing the response packet and providing information to a user on the identified communication node and a voltage on a signal distribution line associated with the identified communication node, and
   wherein the central communication unit is configured for transmitting a test voltage to determine whether the signal distribution network is voltage blocking or voltage passing between the central communication unit and each respective one of the plurality of communication nodes in response to sending a test voltage to assess the state of an associated line as voltage passing or voltage blocking.

6. The system of claim 5 wherein said system is configured for mapping through voltage blocking active and passive devices.

7. A system for mapping signal distribution networks, comprising:
   a central communication unit; and
   a plurality of communication nodes installed at known locations;
   wherein the central communication unit is configured for transmitting an information packet simultaneously to the plurality of communication nodes, and
   wherein the central communication unit is configured for transmitting a test voltage to determine whether the signal distribution network is voltage blocking or voltage passing between the central communication unit and each of said plurality of communication nodes, and
   wherein the plurality of communication nodes are configured for receiving the information packet and signalling to a user that the central communication unit and the communication nodes are on the same signal distribution line, and
   wherein the central communication unit and the plurality of communication nodes may communicate based on said information packet being transmitted by said central communication unit on a known and non-interfering frequency, so long as the plurality of communication nodes exist on the same signal distribution network as the central communication unit, and
   wherein the central communication unit and the plurality of communication nodes are capable of requesting and sending mapping information over a plurality of known frequencies to map the signal distribution network at the known locations, and
   wherein each of the plurality of communication nodes are programmed to respond to a programmed respective request from said central communication unit, and, each of said plurality of communication nodes contains a unique identifier for transmission to said central communication unit, for location of each of said plurality of communication nodes.

8. The system of claim 7 wherein said system is configured for mapping through voltage blocking active and passive devices.

9. A method for mapping signal distribution networks, comprising:
   transmitting an information packet at a non-interfering predetermined request frequency from a central communication unit to a plurality of communication nodes for receipt thereof;
   receiving and processing the information packet by the plurality of communication nodes;
   sending a response packet from one or more of the plurality of communication nodes to the central communication unit at a known response frequency; and
   processing the response packet and providing information from the central communication unit to a user relative to the plurality of communication nodes and/or the voltage on a signal distribution line associated with the plurality of communication nodes,
   wherein the central communication unit and the plurality of communication nodes may communicate based on transmissions of said information packet and said response packet, to thereby determine the location of the at least one communication node, so long as the plurality of communication nodes exists on the same signal distribution network as the central communication unit, and
   wherein the central communication unit is configured for transmitting a test voltage to determine whether the signal distribution network is voltage blocking or voltage passing between the central communication unit and each of said plurality of communication nodes.

10. The method of claim 9 further comprising the steps of:
processing the response packet and providing information from the central communication unit to a user relative to the plurality of communication nodes and/or the voltage on a signal distribution line associated with the plurality of communication nodes in response to sending a test voltage to assess the state of an associated line as voltage passing or voltage blocking.

11. A system for mapping signal distribution networks comprising a central communication unit and a plurality of communication nodes, the system configured to employ the method of claim 9.

12. The system of claim 11 wherein said system is configured for mapping through voltage blocking active and passive devices.

13. A method for mapping signal distribution networks, comprising:
transmitting an information packet at a non-interfering predetermined request frequency from a central communication unit to at least one communication node for receipt thereof;
receiving and processing the information packet through the at least one communication node; and
providing information from the at least one communication node to a user relative to the at least one communication node and/or a voltage on a signal distribution line associated with the at least one communication node,
wherein the central communication unit and the at least one communication node may communicate based on said information packet transmitted by said central communication unit on said non-interfering pre-determined request frequency, so long as the at least one communication node exists on the same signal distribution network as the central communication unit, to thereby confirm the location of the at least one communication node in response to sending a test voltage to assess the state of an associated line as voltage passing or voltage blocking.

14. A system for mapping signal distribution networks comprising a central communication unit and at least one communication node, the system configured to employ the method of claim 13.

* * * * *

UNITED STATES PATENT AND TRADEMARK OFFICE
CERTIFICATE OF CORRECTION

PATENT NO. : 9,930,480 B2
APPLICATION NO. : 15/003793
DATED : March 27, 2018
INVENTOR(S) : Hagood et al.

Page 1 of 1

It is certified that error appears in the above-identified patent and that said Letters Patent is hereby corrected as shown below:

Column 14, Line 47:
Please delete "Informative Related" and insert --Information Relative--.

Signed and Sealed this
Twenty-first Day of August, 2018

Andrei Iancu
*Director of the United States Patent and Trademark Office*